US012783990B2

(12) United States Patent
Kothanda

(10) Patent No.: US 12,783,990 B2
(45) Date of Patent: Nov. 3, 2026

(54) SYSTEMS AND METHODS FOR AUTOMATING CONTAINER PEEL PILE ORGANIZATION

(71) Applicant: Yuga Inc., Fontana, CA (US)

(72) Inventor: Hemanth Kothanda, Fontana, CA (US)

(73) Assignee: Yuga Inc.

( * ) Notice: Subject to any disclaimer, the term of this patent is extended or adjusted under 35 U.S.C. 154(b) by 349 days.

(21) Appl. No.: 18/129,664

(22) Filed: Mar. 31, 2023

(65) Prior Publication Data

US 2024/0330840 A1 Oct. 3, 2024

(51) Int. Cl.

| | |
|---|---|
| ***G06Q 10/0832*** | (2023.01) |
| ***G06Q 10/08*** | (2024.01) |
| ***G06Q 10/083*** | (2024.01) |
| ***G06Q 10/087*** | (2023.01) |

(52) U.S. Cl.

CPC ....... *G06Q 10/0832* (2013.01); *G06Q 10/087* (2013.01)

(58) Field of Classification Search

None

See application file for complete search history.

(56) References Cited

U.S. PATENT DOCUMENTS

| | | | |
|---|---|---|---|
| 9,061,843 B2 | 6/2015 | Torson et al. | |
| 9,710,777 B1 | 7/2017 | Sheykh-Zade et al. | |
| 9,862,557 B2 | 1/2018 | Kasai et al. | |
| 10,647,530 B2 | 5/2020 | He et al. | |
| 2009/0293756 A1 | 12/2009 | Hathaway et al. | |
| 2015/0112476 A1 | 4/2015 | Torson et al. | |
| 2019/0152057 A1* | 5/2019 | Sharp | B25J 9/1664 |
| 2020/0104790 A1 | 4/2020 | Chung | |
| 2020/0247611 A1 | 8/2020 | Sharp et al. | |
| 2021/0130090 A1* | 5/2021 | Stuhaug | B61B 13/00 |
| 2021/0387808 A1* | 12/2021 | Kalouche | B25J 9/026 |
| 2022/0309462 A1 | 9/2022 | Kellaway, Jr. et al. | |

OTHER PUBLICATIONS

Akash Gupta, Optimal stack layout in a sea container terminal with automated lifting vehicles, Jan. 16, 2017 (Year: 2017).*

International Search Report and Written Opinion, dated Jun. 25, 2024, issued in corresponding International Application No. PCT/US2024/022201.

* cited by examiner

*Primary Examiner* — Ismail A Manejwala

(74) *Attorney, Agent, or Firm* — Sigma Law Group LLC

(57) ABSTRACT

Systems and methods for generating and/or automating container peel piles are disclosed. Some embodiments may include systems and methods for generating and/or automating the import and export of containers through shipping terminals, including system and methods for optimizing the stacking of containers in such terminals, so that the process of pickup and delivery of containers by transports is also optimized. In further embodiments, systems and methods are disclosed for generating and/or automating the creation of load maps, such that the optimization of containers stacking occurs.

22 Claims, 25 Drawing Sheets

(a) Top view of a container yard (b) Block of containers

SYSTEMS AND METHODS FOR AUTOMATING CONTAINER PEEL PILE ORGANIZATION

FIELD OF THE DISCLOSURE

The present disclosure relates to systems and methods for automating container peel pile organization.

BACKGROUND

Container terminals are areas where shipping containers are stored for a period of time while either waiting to be picked up, generally via a trucking company or other transport means (e.g., railroad), or exported (e.g., on a cargo ship or other vessel). Container terminals have stacking areas demarcated into blocks or storage areas or piles. Commonly these stacking areas are designated in some manner such as area A, area B, area C or area 1, area 2, area 3.

A container block may be comprised of rows, bays and tiers as shown in FIG. 3. A stack is a space which has the rectangular area on the ground to place a container. While containers are generally of a standardized size, such as 8' (8 foot) width, 20' or 40' or 45' lengths, and 8.5' or 9.5' heights (high cubes). In general, a stack can go up to 5 or 6 containers high in most container terminals.

To know the location of a particular stack in a block, an operator generally needs to know the two co-ordinates (i.e., the bay and the row). To know the location of a single container, an operator generally needs to know the stack and also which tier the container is in (i.e., the operator need to all three co-ordinates in that block which are the bay, the row and the tier).

When a vessel arrives at a terminal, a manifest or baplie is electronically transmitted beforehand, which contains details of each container (e.g., the cargo, container length and height, whether it is refrigerated (sometimes referred to as a Reefer), if it's premium container (i.e., hot cargo), or if it is Chemically sensitive goods designated as DG (Dangerous Goods). Also for each container the destined beneficial cargo owner (BCO) (e.g., Walmart, Target) and the designated drayage companies (i.e., trucking companies) who are permitted to pick up the container.

When Containers are stacked randomly, the needed container can get buried below multiple other containers. An example of this can be seen in FIG. 15. When a truck arrives to pick up a container, the other containers need to be 'Digged' (lifted and moved to other stacks) to get to that container. The same happens, when a container to be loaded on to a vessel is buried inside a stack and needs Digging. These Dig moves are the main cause of inefficiencies within a Container Terminal.

A Peel Pile is a Block of containers where every container, which needs to be transferred to a truck, to be taken in-land or to take it to load on to a vessel, is at Peel Layer. In a truly efficient container terminal, every container must be a peel container.

Currently, the organization and sorting of these containers at container terminals is a massive undertaking and inefficiencies in the sorting, stacking and tracking of these containers in such inefficient manners causes unnecessary delays and additional cost and expense, to the BCOs, drayage companies, shipping companies, and container terminals alike. Therefore, there is a need in the art for systems and methods for automating container peel pile organization.

SUMMARY

One aspect of the present disclosure relates to a system for automating container peel pile organization. The system may include one or more hardware processors configured by machine-readable instructions for automating container peel pile organization. The machine-readable instructions may be configured to receive, via one or more processors, a container identification profile associated with a container. The container identification profile comprises a container type identifier. The machine-readable instructions may be configured to identify, via the one or more processors, a location for placement of the container, based at least in part on the container type identifier. The machine-readable instructions may be configured to send, via the one or more processors, the location for placement of the container to a transporter. The machine-readable instructions may be configured to insert, via the one or more processors, a pickup invitation into a container pickup storage list. The machine-readable instructions may be configured to send, via the one or more processors, one or more pickup invitations from the container pickup storage list, based at least in part on locations of the one or more pickup invitations in the container pickup storage list.

Another aspect of the present disclosure relates to a method for automating container peel pile organization. The method may include receiving, via one or more processors, a container identification profile associated with a container. The container identification profile comprises a container type identifier. The method may include identifying, via the one or more processors, a location for placement of the container, based at least in part on the container type identifier. The method may include sending, via the one or more processors, the location for placement of the container to a transporter. The method may include inserting, via the one or more processors, a pickup invitation into a container pickup storage list. The method may include sending, via the one or more processors, one or more pickup invitations from the container pickup storage list, based at least in part on locations of the one or more pickup invitations in the container pickup storage list.

One purpose of certain embodiments of this invention is to eliminate the Unnecessary dig moves and facilitate a container terminal to become truly efficient. An example of an efficient peel pile, created by exemplary embodiments of the present invention can be seen in FIG. 16.

DETAILED DESCRIPTION

Figure 1A:
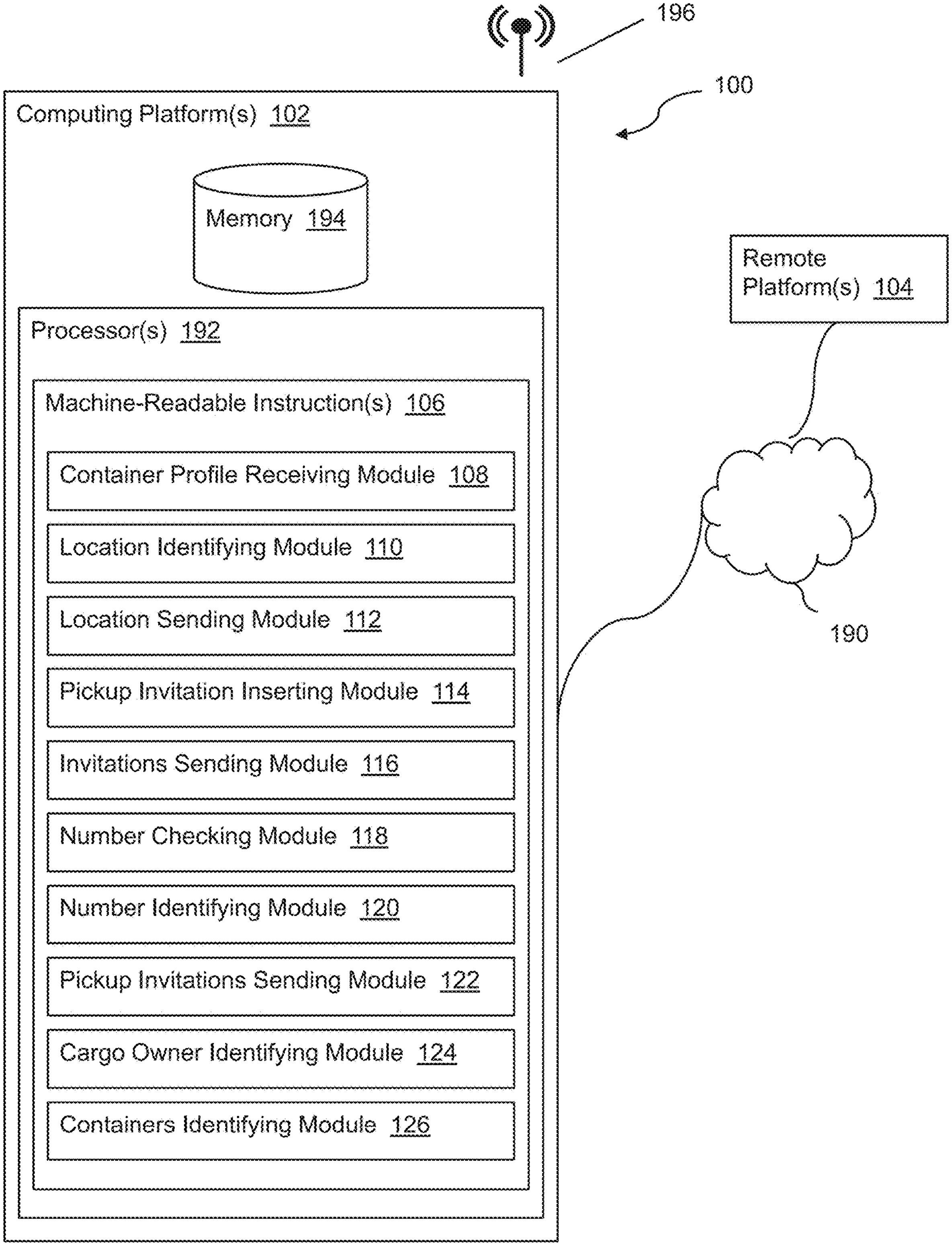
FIG. 1A-1B illustrate a system configured for automating container peel pile organization.
Figure 1B:
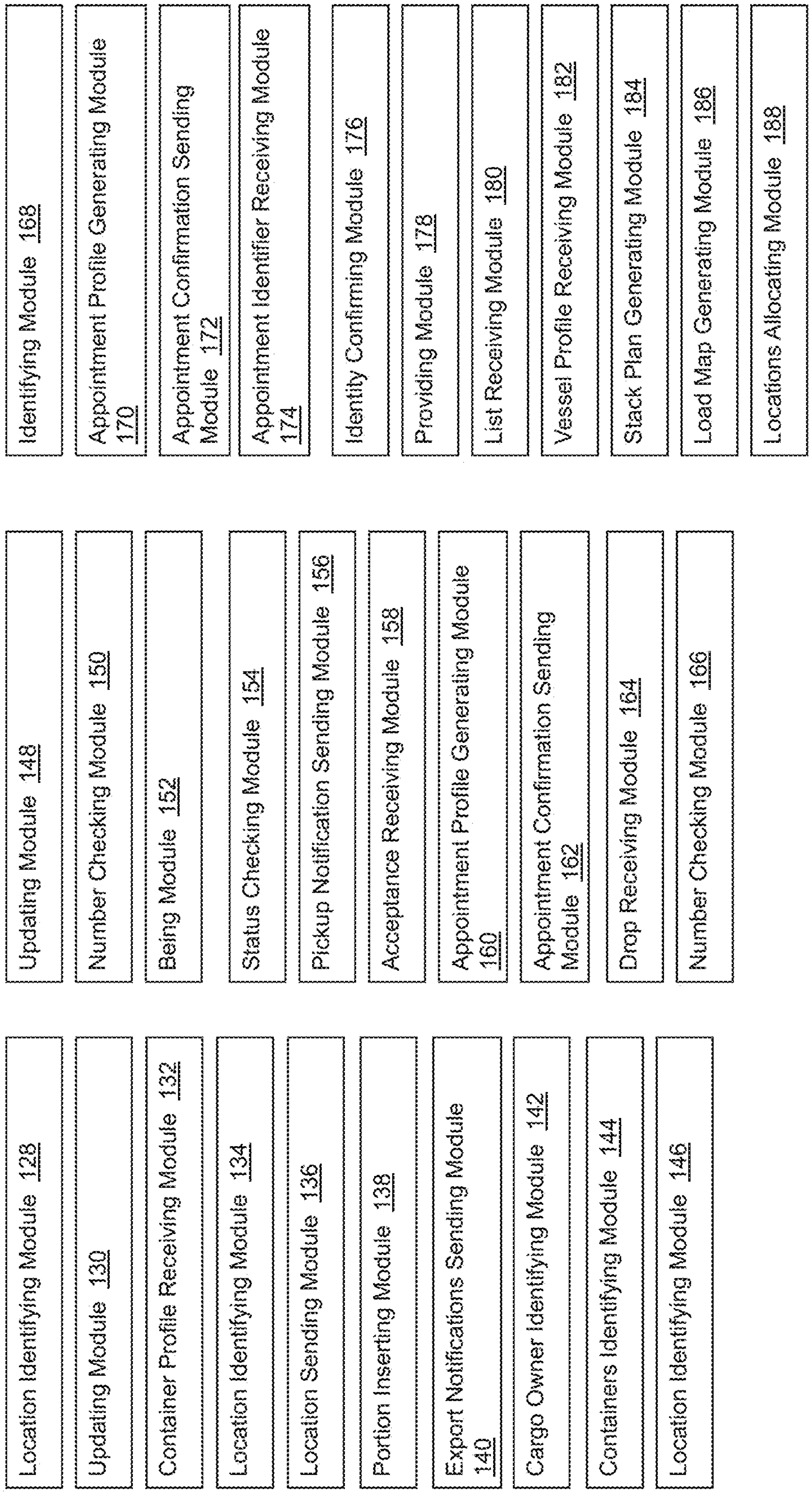

FIG. 1A-1B illustrates a system configured for automating container peel pile organization, in accordance with one or more embodiments. In some cases, system 100 may include one or more computing platforms 102. The one or more computing platforms 102 may be communicably coupled with one or more remote platforms 104. In some cases, users may access the system 100 via remote platform (s) 104.

The one or more computing platforms 102 may be configured by machine-readable instructions 106. Machine-readable instructions 106 may include modules. The modules may be implemented as one or more of functional logic, hardware logic, electronic circuitry, software modules, and the like. The modules may include one or more of container profile receiving module 108, location identifying module 110, location sending module 112, pickup invitation inserting module 114, invitations sending module 116, number checking module 118, number identifying module 120, pickup invitations sending module 122, cargo owner identifying module 124, containers identifying module 126, location identifying module 128, updating module 130, container profile receiving module 132, location identifying module 134, location sending module 136, portion inserting module 138, export notifications sending module 140, cargo owner identifying module 142, containers identifying module 144, location identifying module 146, updating module 148, number checking module 150, being module 152, status checking module 154, pickup notification sending module 156, acceptance receiving module 158, appointment profile generating module 160, appointment confirmation sending module 162, drop receiving module 164, number checking module 166, identifying module 168, appointment profile generating module 170, appointment confirmation sending module 172, appointment identifier receiving module 174, identity confirming module 176, providing module 178, list receiving module 180, vessel profile receiving module 182, stack plan generating module 184, load map generating module 186, locations allocating module 188, and/or other modules. One of ordinary skill in the art would appreciate that any number of the aforementioned modules may be combined of further parsed into separate modules, and embodiments of the present invention are contemplated for use with any number of modules.

According to an embodiment of the present invention, container profile receiving module 108 may be configured to receive a container identification profile associated with a container. In certain embodiments, the container identification profile assists the system in identifying critical information about a container. The container identification profile may be comprised of one or more of a container type identifier, a Beneficial Cargo Owner (BCO) identifier, a destination identifier, an origination identifier, a drayage company identifier, or any combination thereof. Location identifying module 110 may be configured to identify a location for placement of the container, based at least in part on the container type identifier. For instance, if the container type identifier notes that the container is of a specific type (e.g., premium, dangerous goods, refrigerated), the location identifying module may identify an appropriate location based on that specific type of container (e.g., refrigerated containers being sent to a specific area). In further embodiments, the location identifying module 110 can use the container type identifier to locate and select an appropriate area for containers with other special properties, such as locating areas in the container terminal for a dangerous goods container that meets certain criteria needed for storage of such containers (e.g., not within 2 container radius of another DG container). In certain embodiments, the location identifying module can be configured with criteria provided by the operator of the system in order to comply with local regulations or laws controlling the container terminal.

In certain embodiments, location sending module 112 may be configured to send the location for placement of a container to a transporter. A transporter, for the purposes of this application, could be any type of vehicle, device, machine or other equipment capable of moving or otherwise transporting a shipping container. One of ordinary skill in the art would appreciate that there are numerous types of transporters that could be utilized in such a manner, and embodiments of the present invention are contemplated for use with any type of transporter. Locations for placing a container in a container terminal are sometimes called stacks, or "peel piles" when optimized, which are areas where one or more containers may be stacked on top of one another to conserve space.

Figure 16:
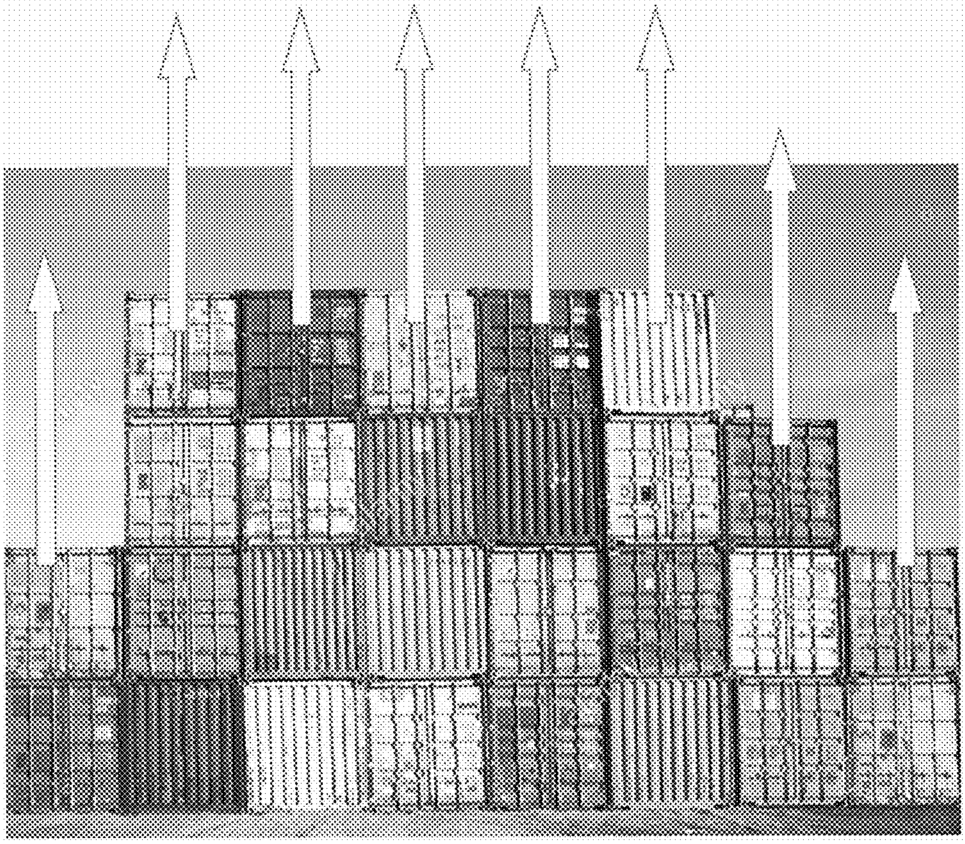
FIG. 16 illustrates a peel pile created in accordance with embodiments of the present invention detailed herein.

It is an aspect of certain embodiments of the present invention to optimize peel piles in order to increase efficiency and delivery timing of the containers. An example of an efficient peel pile, created by exemplary embodiments of the present invention can be seen in FIG. 16. In certain embodiments, part of optimizing a stack into a peel pile means creating stacks where no digging (i.e., moving containers on top of others to get to a lower container) is required, and transports are always getting containers off the top of stacks. This reduces the amount of time a transporter needs to spend in the terminal, which in turn increases the amount of pick ups or drop offs that can be done in a given period of time. It also works to reduce the use or need of other resources that would otherwise be required to dig out a container from a stack, such as cranes or other equipment used to move containers. In certain embodiments of the present invention, the process of generating or automating these peel piles is assisted by artificial intelligence or machine learning means, as detailed elsewhere herein.

Pickup invitation inserting module 114 may be configured to insert a pickup invitation into a container pickup storage list. The pickup invitation may be inserted into the container pickup storage list at a location that may be based at least in part on the container identification profile. For instance, when the container identification profile indicates a container is a "premium" container, the pickup invitation may be inserted into the pickup storage list in a place associated with other premium containers, with the idea that premium containers would be scheduled to be picked up earlier than some other types of containers.

In certain embodiments of the present invention, invitations sending module 116 may be configured to send one or more pickup invitations from the container pickup storage list, based at least in part on locations of the one or more pickup invitations in the container pickup storage list. For instance, as noted above, the premium containers may be scheduled for invitation before standard containers, which may also be behind refrigerated or other types of containers. One of ordinary skill in the art would appreciate that there are numerous ways to organize the pickup storage list, and embodiments of the present invention are contemplated for use with any such manner of organization.

In certain embodiments of the present invention, number checking module 118 may be configured to checking a total number of uncompleted sent pickup invitations. Number identifying module 120 may be configured to identify the total number of uncompleted, but sent, pickup invitations being below a max threshold of total uncompleted sent pickup invitations. Pickup invitations sending module 122 may be configured to send additional pickup invitations from the container pickup storage list until the max threshold of total uncompleted sent pickup invitations is reached. As pickups are completed, and the number of uncompleted sent pickup invitations goes down, the system can be configured to repeat the sending process, up to the threshold. In certain embodiments, there is no max threshold, and the system can continually send pickup invitations without restriction.

According to an embodiment of the present invention, cargo owner identifying module 124 may be configured to identify a beneficial cargo owner, based at least in part on the container identification profile. Containers identifying module 126 may be configured to identify one or more containers associated with the beneficial cargo owner. Location identifying module 128 may be configured to identify a location of the one or more containers associated with the beneficial cargo owner. Updating module 130 may be configured to update the location for placement of the container based at least in part on the location of the one or more containers associated with the beneficial cargo owner.

Container profile receiving module 132 may be configured to receive a second container identification profile associated with a second container. Location identifying module 134 may be configured to identify a second location for placement of the second container, based at least in part on the second container type identifier.

In certain embodiments of the present invention, location sending module 136 may be configured to send the second location for placement of the second container to a second transporter. Portion inserting module 138 may be configured to insert at least a portion of the second container identification profile into a container export list. Export notifications sending module 140 may be configured to send one or more export notifications from the container export list.

According to an embodiment of the present invention, cargo owner identifying module 142 may be configured to identify a beneficial cargo owner, based at least in part on the second container identification profile. Containers identifying module 144 may be configured to identify one or more containers associated with the BCO.

According to an embodiment of the present invention, location identifying module 146 may be configured to identify a location of the one or more containers associated with the beneficial cargo owner. Updating module 148 may be configured to update the second location for placement of the second container based at least in part on the location of the one or more containers associated with the beneficial cargo owner.

In certain embodiments of the present invention, number checking module 150 may be configured to checking a total number of transports at a terminal where the location for placement of the container is located. Being module 152 may be configured to invitations be below a max threshold of total transports permissible at the terminal. Status checking module 154 may be configured to check status of container handling equipment at the terminal where the location for placement of the container is located. Pickup notification sending module 156 may be configured to send a pickup notification to a second transporter, based at least in part on the status of the container handling equipment being returned as operational and the total number of transports at the terminal where the location for placement of the container is located is below the max threshold of total transports permissible at the terminal.

In certain embodiments of the present invention, acceptance receiving module 158 may be configured to receive an acceptance of a first pickup invitation selected from one or more pickup invitations. Appointment profile generating module 160 may be configured to generate an appointment profile, based at least in part on the transport profile. Appointment confirmation sending module 162 may be configured to send an appointment confirmation to a recipient. In some cases, the transport profile further comprises one or more of an identification of a type of vehicle, a type of chassis, and a driver identifier.

According to an embodiment of the present invention, drop receiving module 164 may be configured to receiving a drop off request. Terminals may have a maximum capacity of transporters on site at any given time. This may be managed by local rules or regulation, or simply set by the terminal operator in order to reduce traffic, delays, safety risks or any other concerns. As such, in certain embodiments, number checking module 166 may be configured to checking a total number of incomplete appointments at a terminal. Identifying module 168 may be configured to identify whether the total number of incomplete appointments is below a max threshold of total appointments permissible at the terminal.

Once there is room for an additional appointment, the system may be configured to generate a new appointment. In certain embodiments of the present invention, Appointment profile generating module 170 may be configured to generate an appointment detail profile, based at least in part on the drop off profile. The information contained in these appointment detail profile may comprise information about the location for drop off, container type, transporter identification (e.g., driver's ID, biometric information to identify driver, license plate information). One of ordinary skill in the art would appreciate that there are numerous data points that could be used in the appointment detail profile and drop off profile, and embodiments of the present invention are contemplated for use with any such information. Appointment confirmation sending module 172 may be configured to send an appointment confirmation to a second transporter.

Appointment identifier receiving module 174 may be configured to receive an appointment identifier. Identity confirming module 176 may be configured to confirm an identity of a second transporter based at least in part on the appointment identifier. Providing module 178 may be configured to provide to the second transporter an appointment information profile.

List receiving module 180 may be configured to receive a list of a plurality of containers for export on a vessel. Vessel profile receiving module 182 may be configured to receive a vessel profile associated with the vessel. Stack plan generating module 184 may be configured to generate a stack plan, based at least in part on container profiles associated with the plurality of containers and the vessel profile. Load map generating module 186 may be configured to generate a load map from the stack plan. Locations allocating module 188 may be configured to allocate locations in the load map for each of the plurality of containers.

In some cases, the one or more computing platforms 102, may be communicatively coupled to the remote platform(s) 104. In some cases, the communicative coupling may include communicative coupling through a networked environment 190. The networked environment 190 may be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which one or more computing platforms 102 and remote platform(s) 104 may be operatively linked via some other communication coupling. The one or more one or more computing platforms 102 may be configured to communicate with the networked environment 190 via wireless or wired connections. In addition, in an embodiment, the one or more computing platforms 102 may be configured to communicate directly with each other via wireless or wired connections. Examples of one or more computing platforms 102 may include, but is not limited to, smartphones, wearable devices, tablets, laptop computers, desktop computers, Internet of Things (IoT) device, or other mobile or stationary devices. In an embodiment, system 100 may also include one or more hosts or servers, such as the one or more remote platforms 104 connected to the networked environment 190 through wireless or wired connections. According to one embodiment, remote platforms 104 may be implemented in or function as base stations (which may also be referred to as Node Bs or evolved Node Bs (eNBs)). In other embodiments, remote platforms 104 may include web servers, mail servers, application servers, etc. According to certain embodiments, remote platforms 104 may be standalone servers, networked servers, or an array of servers.

The one or more computing platforms 102 may include one or more processors 192 for processing information and executing instructions or operations. One or more processors 192 may be any type of general or specific purpose processor. In some cases, multiple processors 192 may be utilized according to other embodiments. In fact, the one or more processors 192 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In some cases, the one or more processors 192 may be remote from the one or more computing platforms 102, such as disposed within a remote platform like the one or more remote platforms 192 of FIG. 1A-1B.

The one or more processors 192 may perform functions associated with the operation of system 100 which may include, for example, precoding of antenna gain/phase parameters, encoding and decoding of individual bits forming a communication message, formatting of information, and overall control of the one or more computing platforms 102, including processes related to management of communication resources.

The one or more computing platforms 102 may further include or be coupled to a memory 194 (internal or external), which may be coupled to one or more processors 192, for storing information and instructions that may be executed by one or more processors 192. Memory 194 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 194 can consist of any combination of random access memory (RAM), read only memory (ROM), static storage such as a magnetic or optical disk, hard disk drive (HDD), or any other type of non-transitory machine or computer readable media. The instructions stored in memory 194 may include program instructions or computer program code that, when executed by one or more processors 192, enable the one or more computing platforms 102 to perform tasks as described herein.

In some embodiments, one or more computing platforms 102 may also include or be coupled to one or more antennas 196 for transmitting and receiving signals and/or data to and from one or more computing platforms 102. The one or more antennas 196 may be configured to communicate via, for example, a plurality of radio interfaces that may be coupled to the one or more antennas 196. The radio interfaces may correspond to a plurality of radio access technologies including one or more of LTE, 5G, WLAN, Bluetooth, near field communication (NFC), radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

In various embodiments, the systems and methods depicted herein may utilize various machine learning (ML) and/or artificial intelligence (AI) systems, including, but not limited to, machine learning models trained on various amounts of test and training data, neural networks (e.g., Artificial Neural Networks (ANN), Convolution Neural Networks (CNN), Recurrent Neural Networks (RNN)), deep learning models and deep-learning-based generative models (e.g., generative adversarial networks (GANs)). One of ordinary skill in the art would appreciate that there are numerous types of ML and AI systems that could be used for the purposes detailed herein, and embodiments of the present invention are contemplated for use with any such ML or AI system.

FIGS. 2A, 2B, 2C, 2D, 2E, 2F, 2G, 2H, 2I and/or 2J illustrate an example flow diagram of a method 200, according to one embodiment. The method 200 may include receiving, via one or more processors, a container identification profile associated with a container at block 202, the container identification profile comprises a container type identifier. Container type identifier may include information about the contents of the container, such as identification as dangerous goods, refrigerated goods, or other goods classifications. Container type identifier may also include information about the container and contents itself, such as marking the container as a "premium" container, which is prioritized for pickup.

The method 200 may include identifying, via the one or more processors, a location for placement of the container, based at least in part on the container type identifier at block 204. In certain embodiments of the present invention, identification of a location for placement can be weighted on several factors. For instance, if there is a stack which has not reached maximum tiers and has containers going to the same trucking company and/or BCO, and the containers are of the same length, then the system can prioritize placing other containers at the same location in order to optimize pickup by the trucking company. One of ordinary skill in the art would appreciate that there are numerous data points on which the system could use to optimize and select locations for containers, and embodiments of the present invention are contemplated for use with any such data points. Further, embodiments of the present invention may utilize various ML or AI systems, where training and test data are used in such ML or AI system to identify the optimal location. Other embodiments may utilize other forms of ML or AI as detailed elsewhere herein.

The method 200 may include sending, via the one or more processors, the location for placement of the container to a transporter at block 206. This information can be used by the transporter to pickup the container and place it at the appropriate location. The information may be comprised of data such as current location of a container, destination location of a container, size of the container, or any combination thereof. One of ordinary skill in the art would appreciate that there are numerous data points that could be used, and embodiments of the present invention are contemplated for use with any such data points.

The method 200 may include inserting, via the one or more processors, a pickup invitation into a container pickup storage list at block 208, the pickup invitation being inserted into the container pickup storage list at a location that being based at least in part on the container identification profile. For instance, container identification profiles identifying a container as a premium or refrigerated container may be placed ahead of non-premium or non-refrigerated containers.

The method 200 may include sending, via the one or more processors, one or more pickup invitations from the container pickup storage list, based at least in part on locations of the one or more pickup invitations in the container pickup storage list at block 210. For instance, invitations may be sent to those who are picking up premium containers before those who are picking up non-premium containers.

Further, according to certain embodiments of the present invention, the selection of a particular container from the container pickup storage list may be based, at least in part, on data related to where the containers are stored and/or stacked. In certain embodiments, pickup invitations may be selected based, at least in part, on stacking order of containers, in order to have containers picked up in an order without requiring digging, thereby ensuring that stacks are peel piles. In certain embodiments, the system may utilize machine learning and/or artificial intelligence systems and methods to optimize the selection of containers and distribution of invitations in such a manner as to result in every stack being a peel pile. For instance, a machine learning model trained on data related various data points, such as time between sending an invitation to pickup of container of various transporters, transporter availability (e.g., are certain transporters already invited to pickup other containers), location of container in terminal, or any other relevant data point, or any combination thereof, could be used to provide predictive analytics on the estimated arrival of a transporter and make determinations on invitations based on a known stacking order of containers in the terminal. In this manner, the predictive analytics provided could be used to help ensure every stack ends up being a peel pile.

Figure 2A:
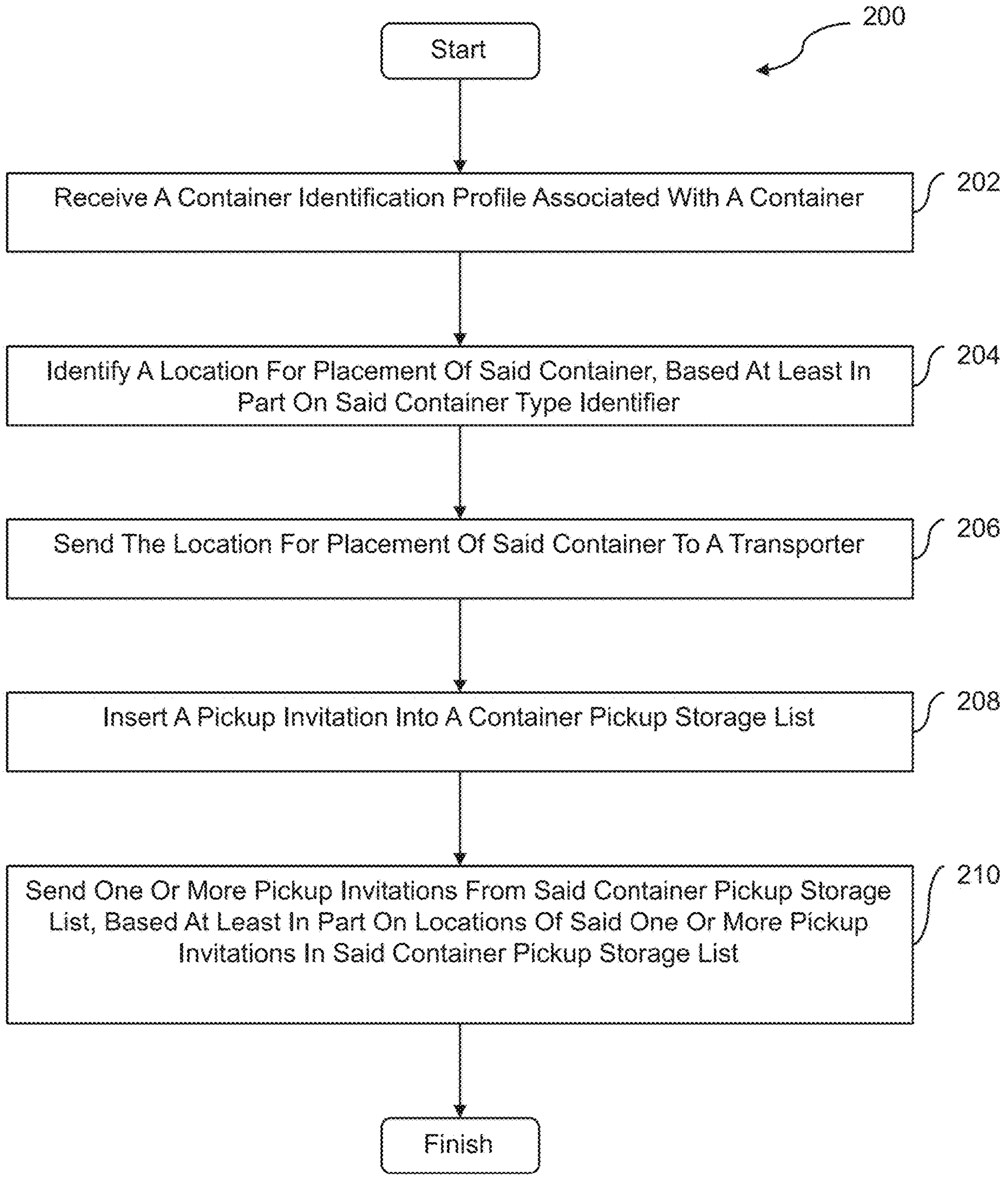
FIG. 2A-2J illustrate methods for automating container peel pile organization, in accordance with an embodiment of the present invention.
Figure 2B:
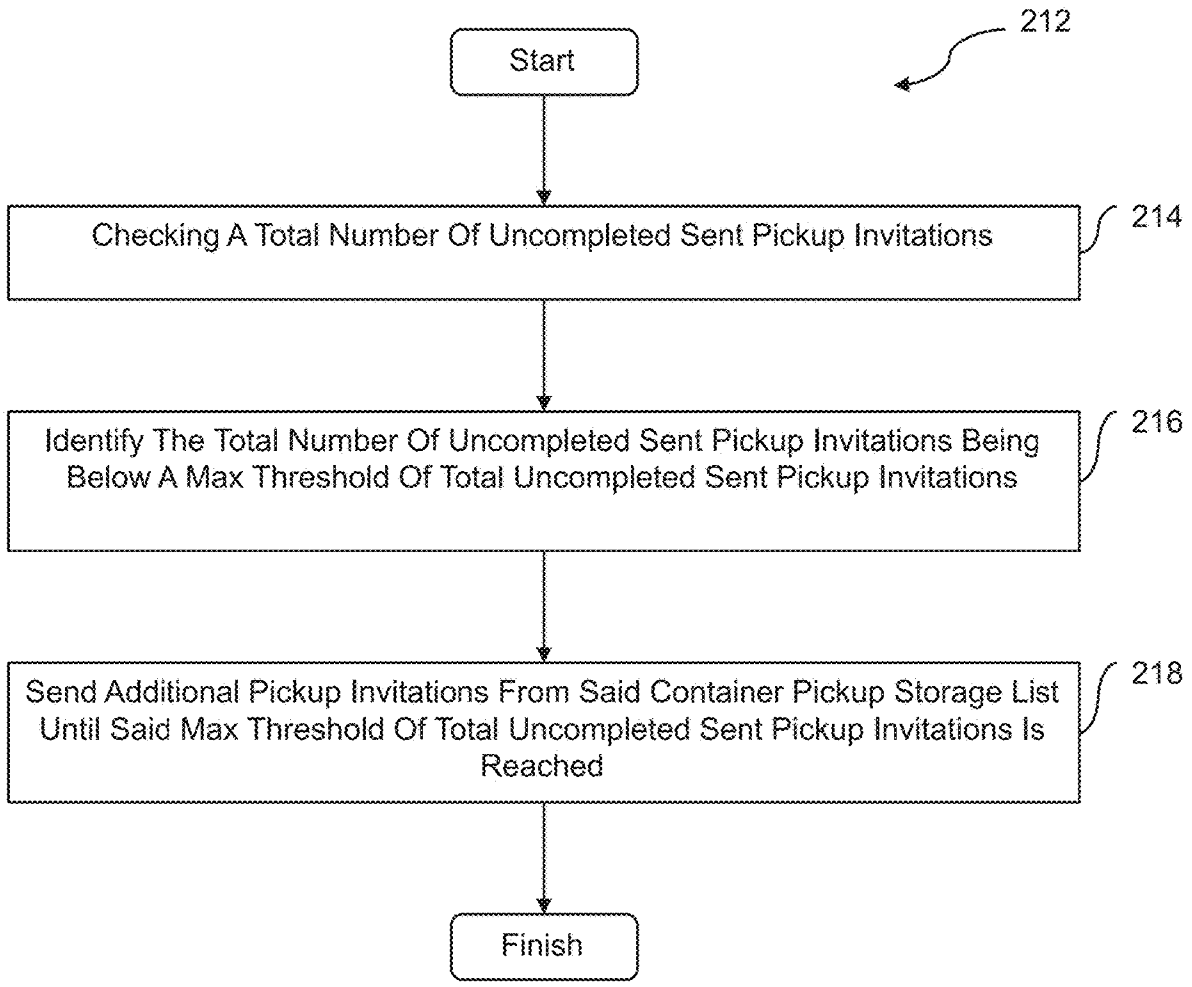

In FIG. 2B, the method 200 may be continued at 212, and may further include checking a total number of uncompleted sent pickup invitations at block 214. The method 200 continued at 212 may further include identifying the total number of uncompleted sent pickup invitations being below a max threshold of total uncompleted sent pickup invitations at block 216. The method 200 continued at 212 may also further include sending additional pickup invitations from the container pickup storage list until the max threshold of total uncompleted sent pickup invitations is reached at block 218.

Figure 2C:
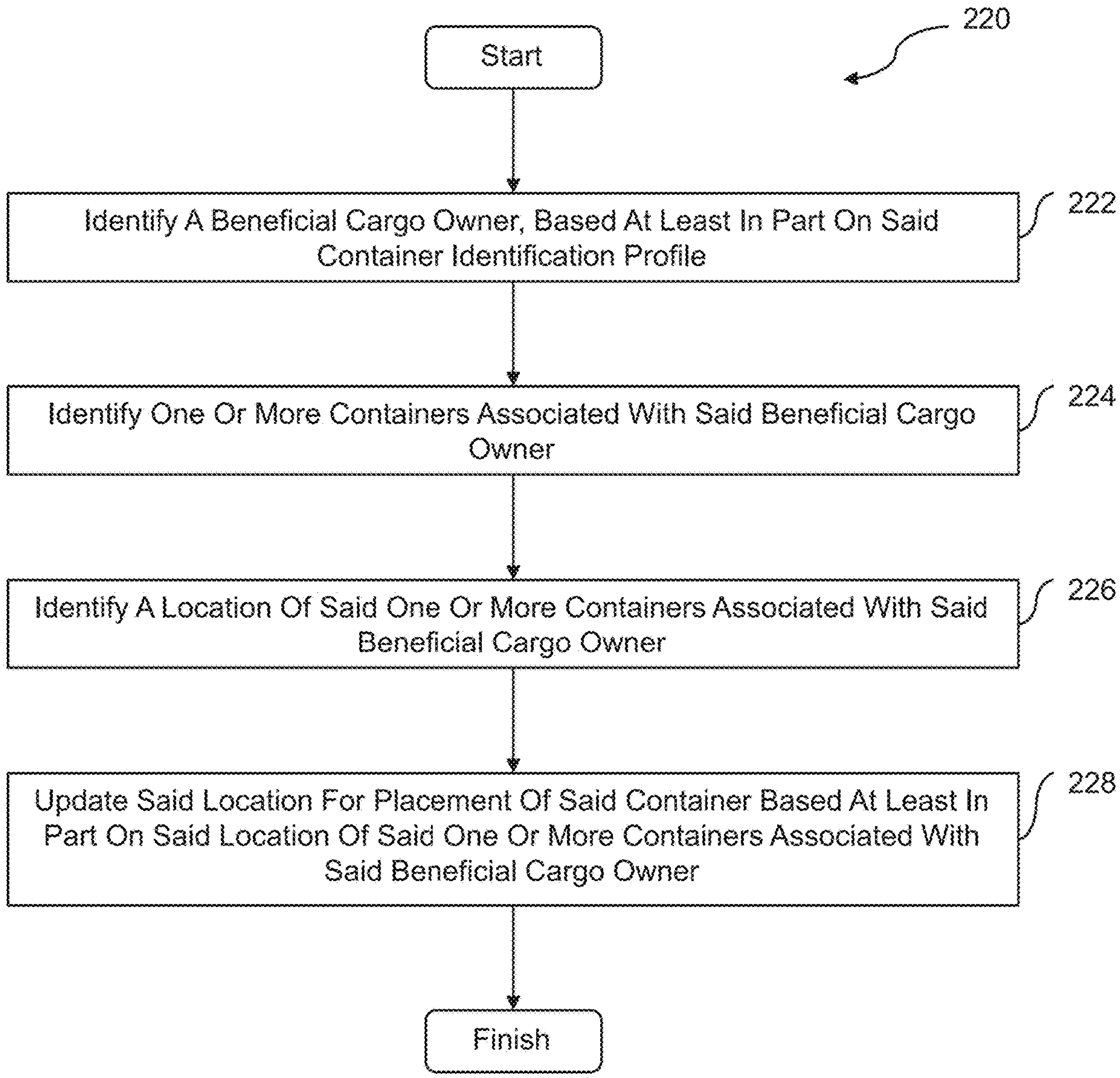

In FIG. 2C, the method 200 may be continued at 220, and may further include identifying a beneficial cargo owner, based at least in part on the container identification profile at block 222. The method 200 continued at 220 may further include identifying one or more containers associated with the beneficial cargo owner at block 224. The method 200 continued at 220 may further include identifying a location of the one or more containers associated with the beneficial cargo owner at block 226. The method 200 continued at 220 may also further include updating the location for placement of the container based at least in part on the location of the one or more containers associated with the beneficial cargo owner at block 228.

Figure 2D:
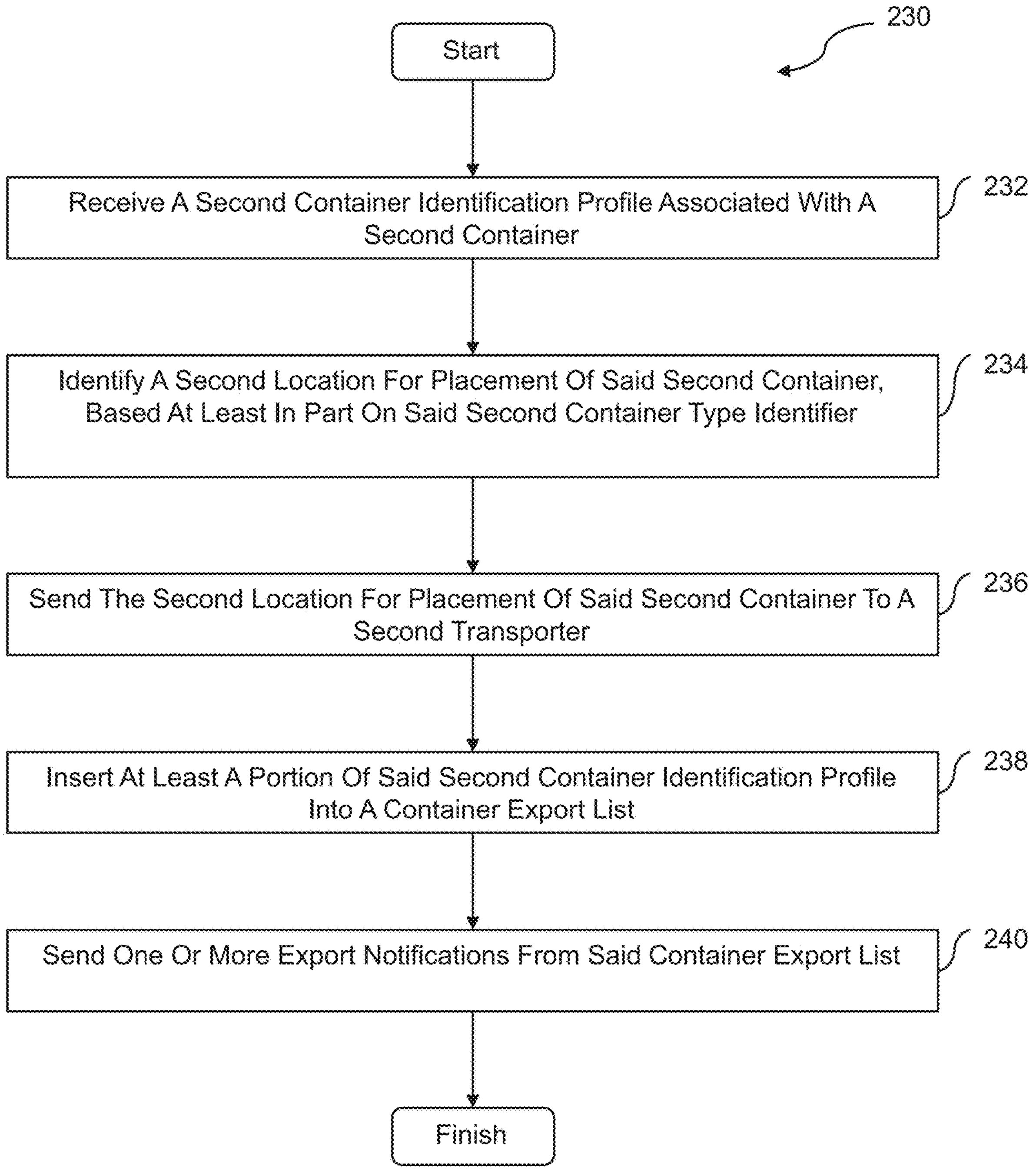

The system and methods described herein are not solely for the management of inbound containers, but also for managing containers to be exported as well. As shown in FIG. 2D, the method 200 may be continued at 230, and may further include receiving a second container identification profile associated with a second container at block 232. Here, the second container is intended for export.

The method 200 continued at 230 may further include identifying a second location for placement of the second container, based at least in part on the second container type identifier at block 234. In certain embodiments, much like inbound containers, export containers are identified, in part, by the designation of their contents and whether or not they are marked as premium or have another designation. The method 200 continued at 230 may further include sending the second location for placement of the second container to a second transporter at block 236. The method 200 continued at 230 may further include inserting at least a portion of the second container identification profile into a container export list at block 238. In certain embodiments, the second container identification profile associated with a container to be exported may comprise information such as vessel identifier, voyage identifier, shipping Line designation, destination port, container profile information, such as "premium", dangerous cargo, out of dimension cargo, BCO, drayage company, and other relevant information. One of ordinary skill in the art would appreciate that there are numerous data points that could be utilized in such second container identification profiles, and embodiments of the present invention are contemplated for use with any such data points. The method 200 continued at 230 may also further include sending one or more export notifications from the container export list at block 240.

Figure 2E:
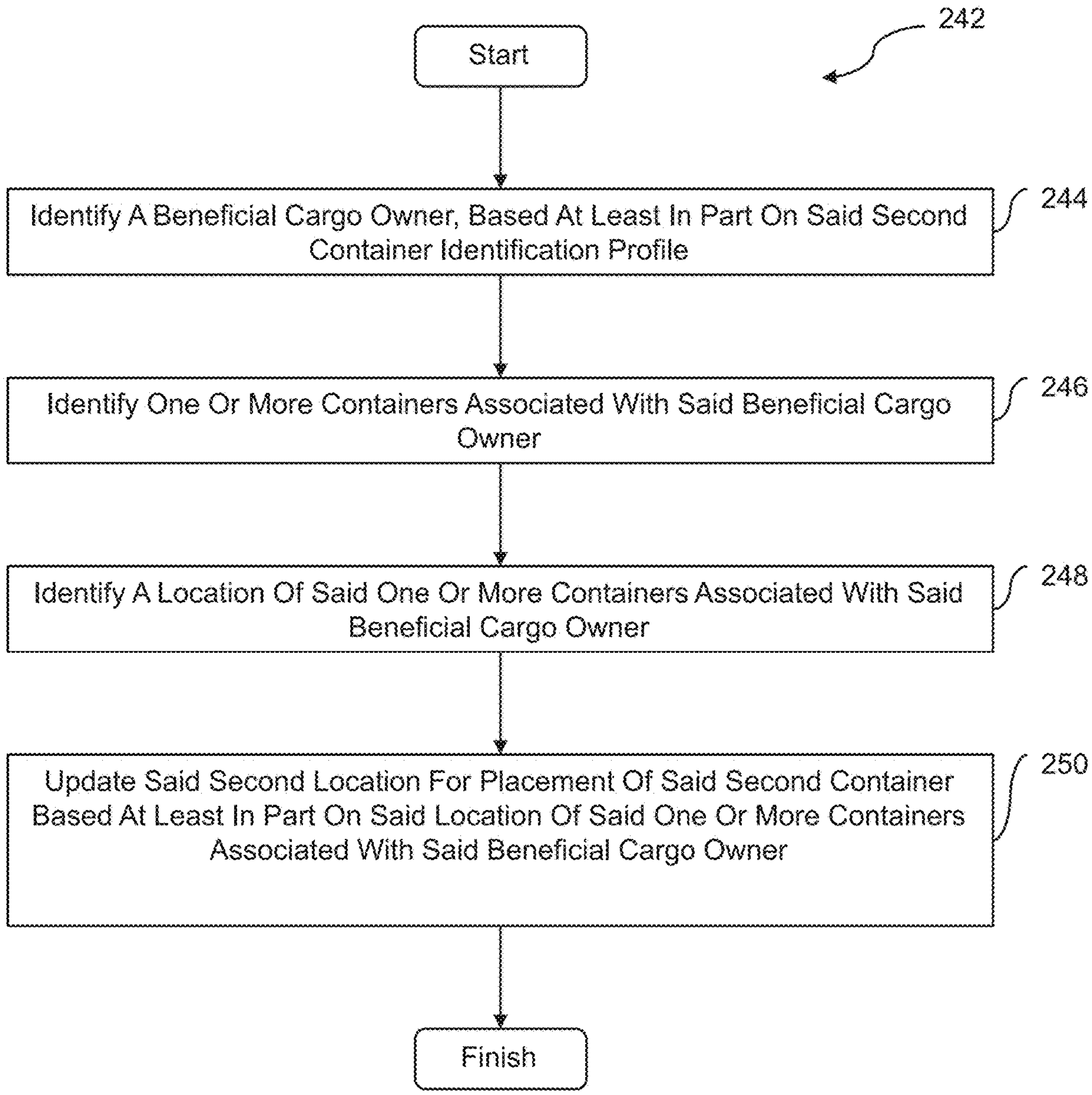

In FIG. 2E, the method 200 may be continued at 242, and may further include identifying a beneficial cargo owner, based at least in part on the second container identification profile at block 244. The method 200 continued at 242 may further include identifying one or more containers associated with the beneficial cargo owner at block 246. The method 200 continued at 242 may further include identifying a location of the one or more containers associated with the beneficial cargo owner at block 248. The method 200 continued at 242 may also further include updating the second location for placement of the second container based at least in part on the location of the one or more containers associated with the beneficial cargo owner at block 250. For instance, in certain embodiments the system may be configured to find a space with enough length in a lateral row or closest to the lateral rows in a block which is next in queue for that beneficial cargo owner. The system could optimize placement, such as utilizing information about the terminal and which rows (e.g., lateral rows) have easiest accessibility to a transporter. The system could be optimized to reserve such locations and send the container to that stack space to increase overall efficiencies.

Figure 2F:
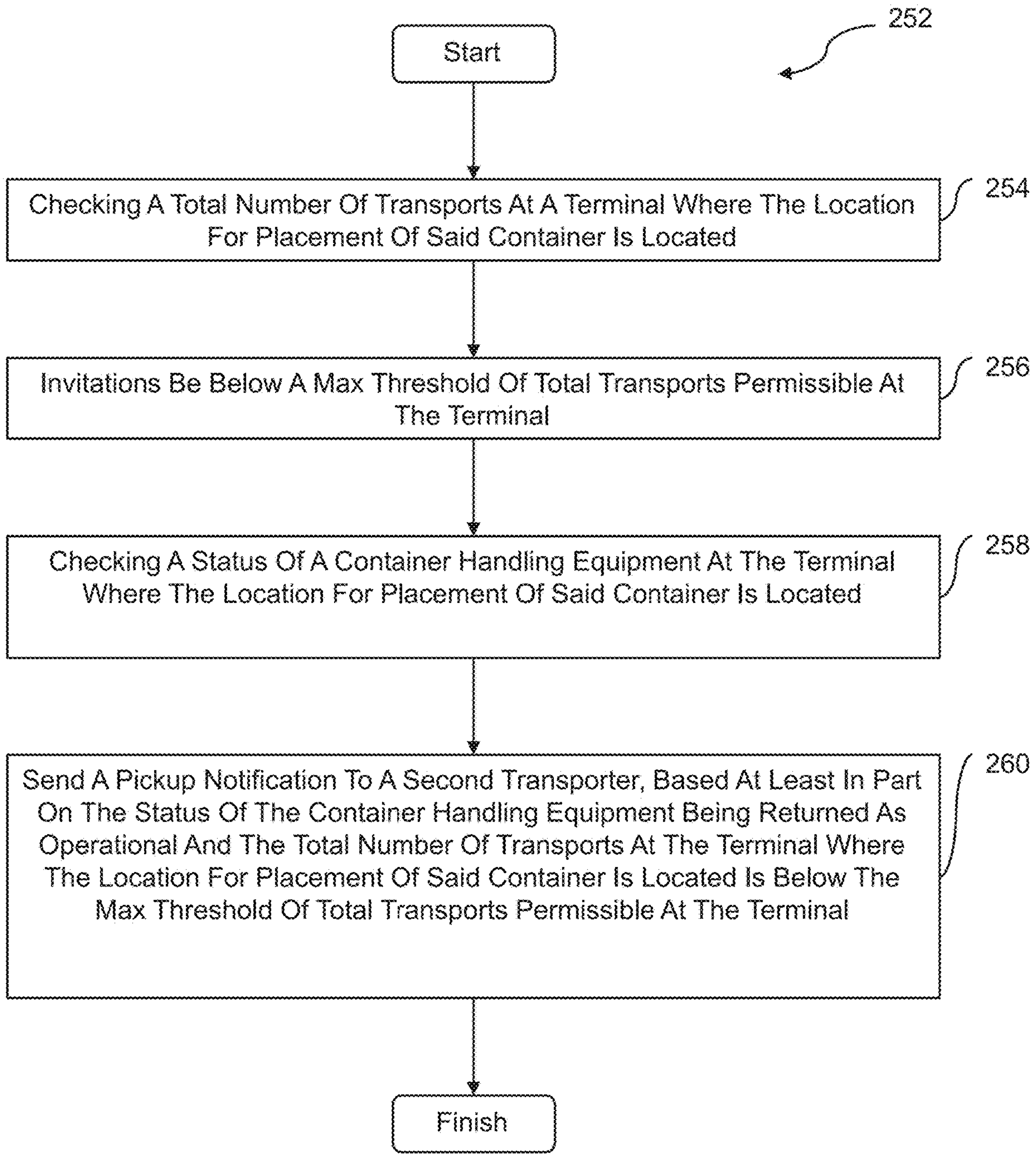

In FIG. 2F, the method 200 may be continued at 252, and may further include checking a total number of transports at a terminal where the location for placement of the container is located at block 254. The method 200 continued at 252 may further include checking to see if invitations are below a max threshold of total transports permissible at the terminal at block 256. This ensures that there are never more than a maximum number of transports at the terminal at any given time. This can be done to ensure safety and efficiency within the terminal.

The method 200 continued at 252 may further include checking a status of a container handling equipment, such as stacking cranes and mobile handlers, at the terminal where the location for placement of the container is located at block 258. This ensures that the equipment used to handle the containers are operational. If such equipment is not operational, then it would likely be inappropriate to send additional invitations to transports.

The method 200 continued at 252 may also further include sending a pickup notification to a second transporter, based at least in part on the status of the container handling equipment being returned as operational and the total number of transports at the terminal where the location for placement of the container is located is below the max threshold of total transports permissible at the terminal at block 260. Assuming the handling equipment is operational and the terminal is not at a maximum for total transports, additional pickups can be scheduled.

Figure 2G:
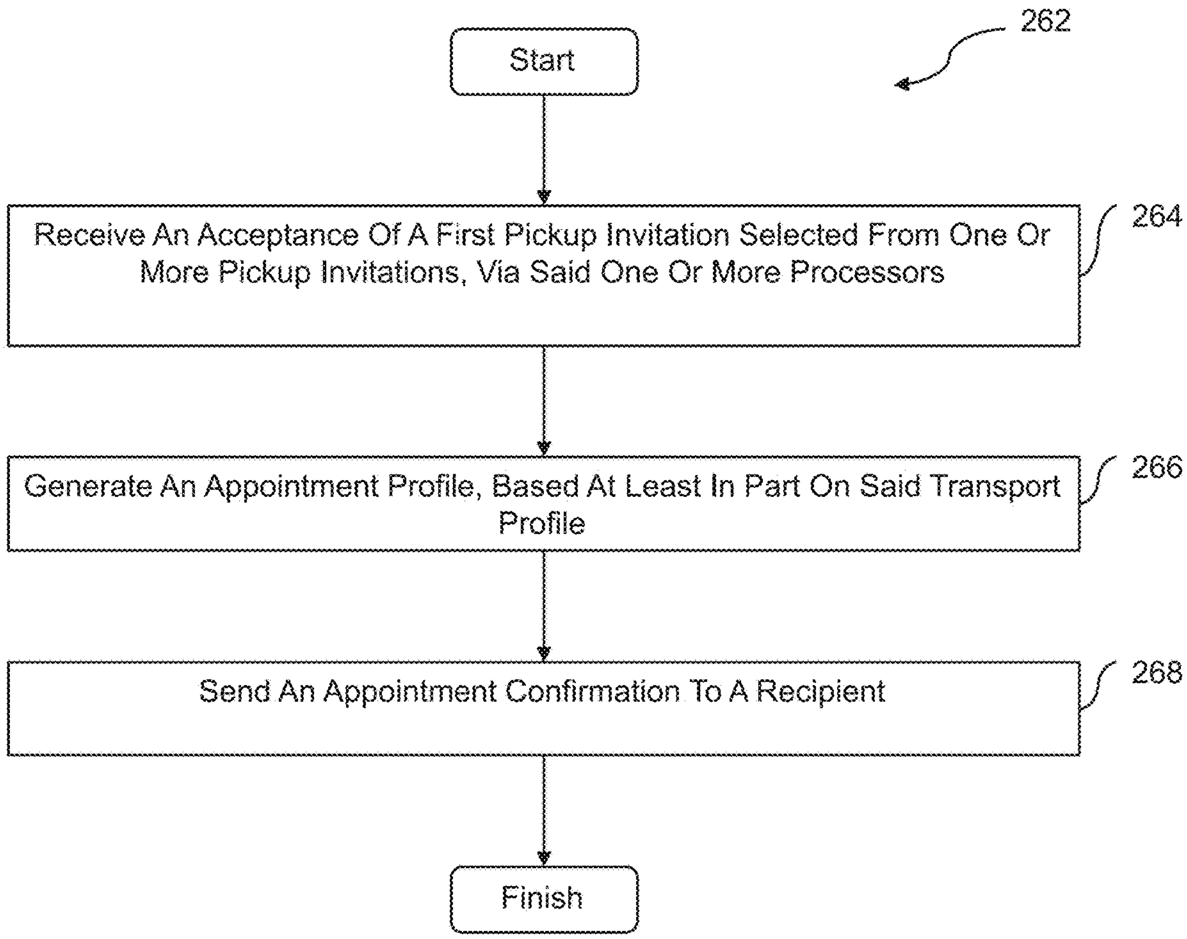

In FIG. 2G, the method 200 may be continued at 262, and may further include receiving an acceptance of a first pickup invitation selected from one or more pickup invitations, via the one or more processors at block 264. The method 200 continued at 262 may further include generating an appointment profile, based at least in part on the transport profile at block 266. The method 200 continued at 262 may also further include sending an appointment confirmation to a recipient at block 268.

Figure 2H:
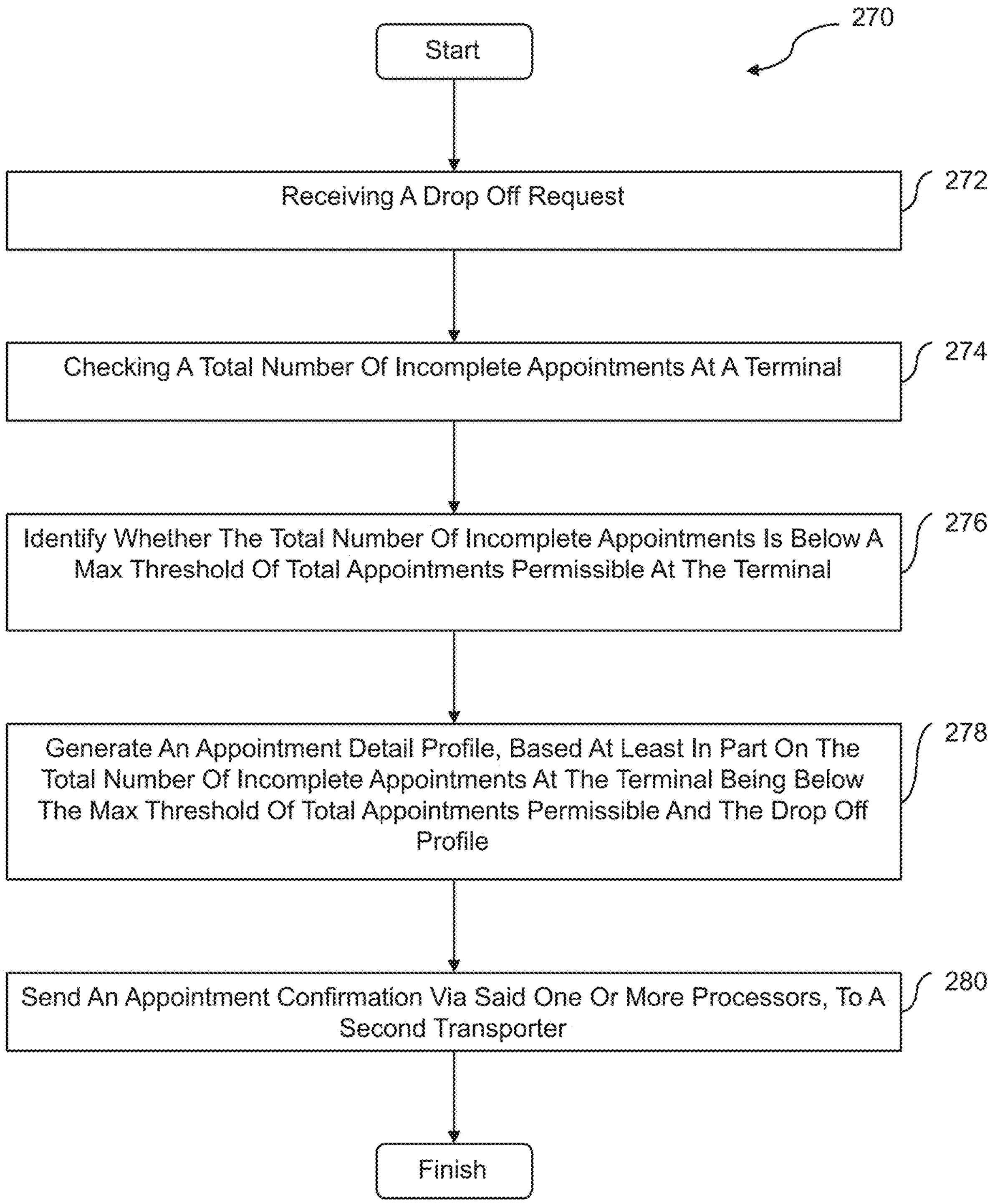

In FIG. 2H, the method 200 may be continued at 270, and may further include receiving a drop off request at block 272. The method 200 continued at 270 may further include checking a total number of incomplete appointments at a terminal at block 274. The method 200 continued at 270 may further include identifying whether the total number of incomplete appointments is below a max threshold of total appointments permissible at the terminal at block 276. The method 200 continued at 270 may further include generating an appointment detail profile, based at least in part on the total number of incomplete appointments at the terminal being below the max threshold of total appointments permissible and the drop off profile at block 278. The method 200 continued at 270 may also further include sending an appointment confirmation via the one or more processors, to a second transporter at block 280.

Figure 2I:
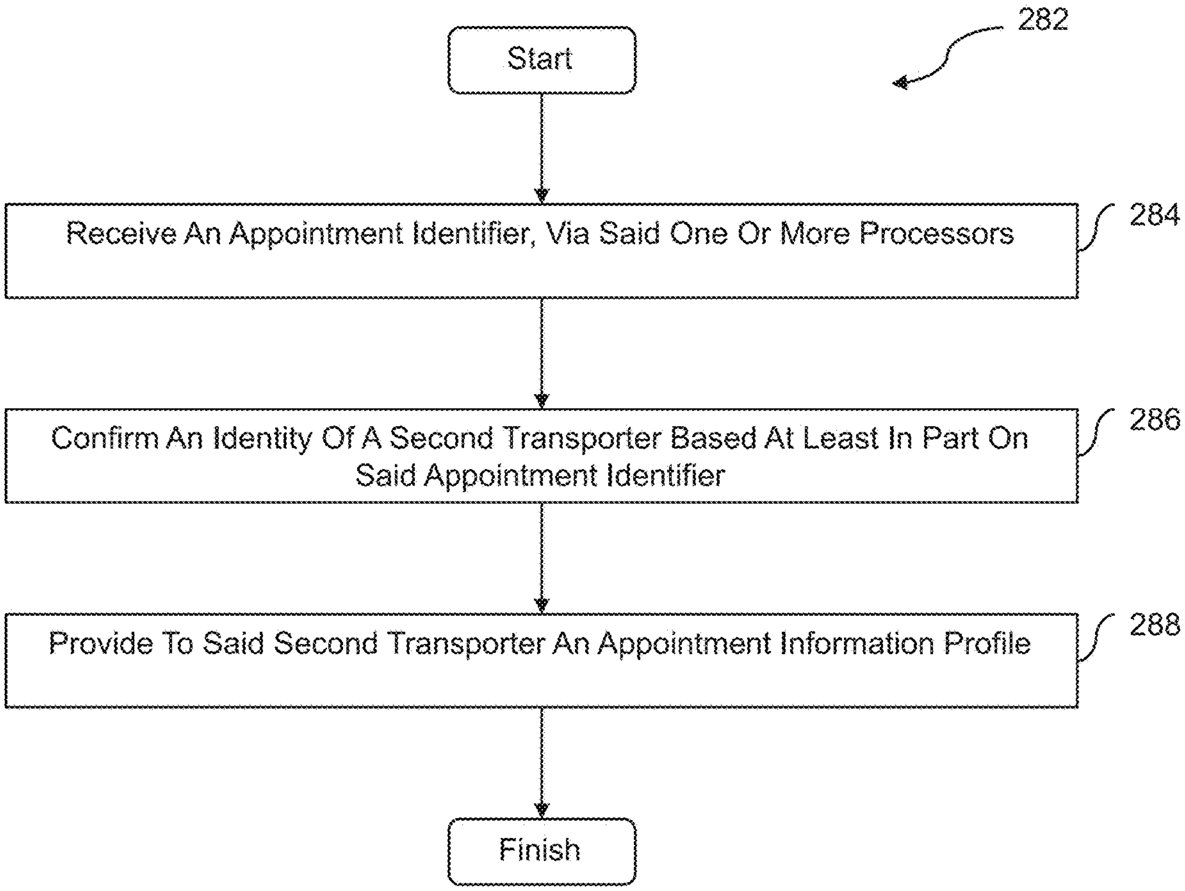

In FIG. 2I, the method 200 may be continued at 282, and may further include receiving an appointment identifier, via the one or more processors at block 284. Here, a transporter enters their appointment identifier into the system, and the system moved to confirm the transporter is authorized and verified with respect to the appointment.

The method 200 continues at 282 may further include confirming an identity of a second transporter based at least in part on the appointment identifier at block 286. For instance, the system may be configured to confirm identification of the transporter via their government issued ID, other identification (e.g., ID card specific to the terminal), biometric information (e.g., thumbprint, facial recognition, iris scan), or any other appropriate means for confirming identity, or any combination thereof. Further, the system may also be configured to capture and/or validate other information about the transport vehicle, such as the license plate, and make and model of the vehicle.

Once the transporter's identity is confirmed, the method 200 continued at 282 may also further include providing to the second transporter an appointment information profile at block 288. The appointment information profile may comprise information such as the location for the container to be deposited at and how to get to such location. In certain embodiments of the present invention, location can be broadcast to a device of the transporter via various means, such as via proprietary applications, GPS systems, SMS text messages, web browsers, native mobile apps, or any combination thereof. One of ordinary skill in the art would appreciate that there are numerous means and methods for providing such information to the device of a transporter, and embodiments of the present invention are contemplated for use with any such means and methods.

When a vessel arrives at a terminal, discharge plans and loading plans are generated. In general, each bay, hatch and hold in the vessel has containers stacked below deck covered by the hatch covers and then containers are also stacked above deck. In most common situations, containers above deck have to be discharged first to reach containers below deck. While operating below deck, crane operators can discharge and load containers simultaneously. Typically, to load containers above deck, all loading below deck has to be completed and the hatch needs to be closed and secured with hatch covers and then containers can be Loaded above deck.

Figure 2J:
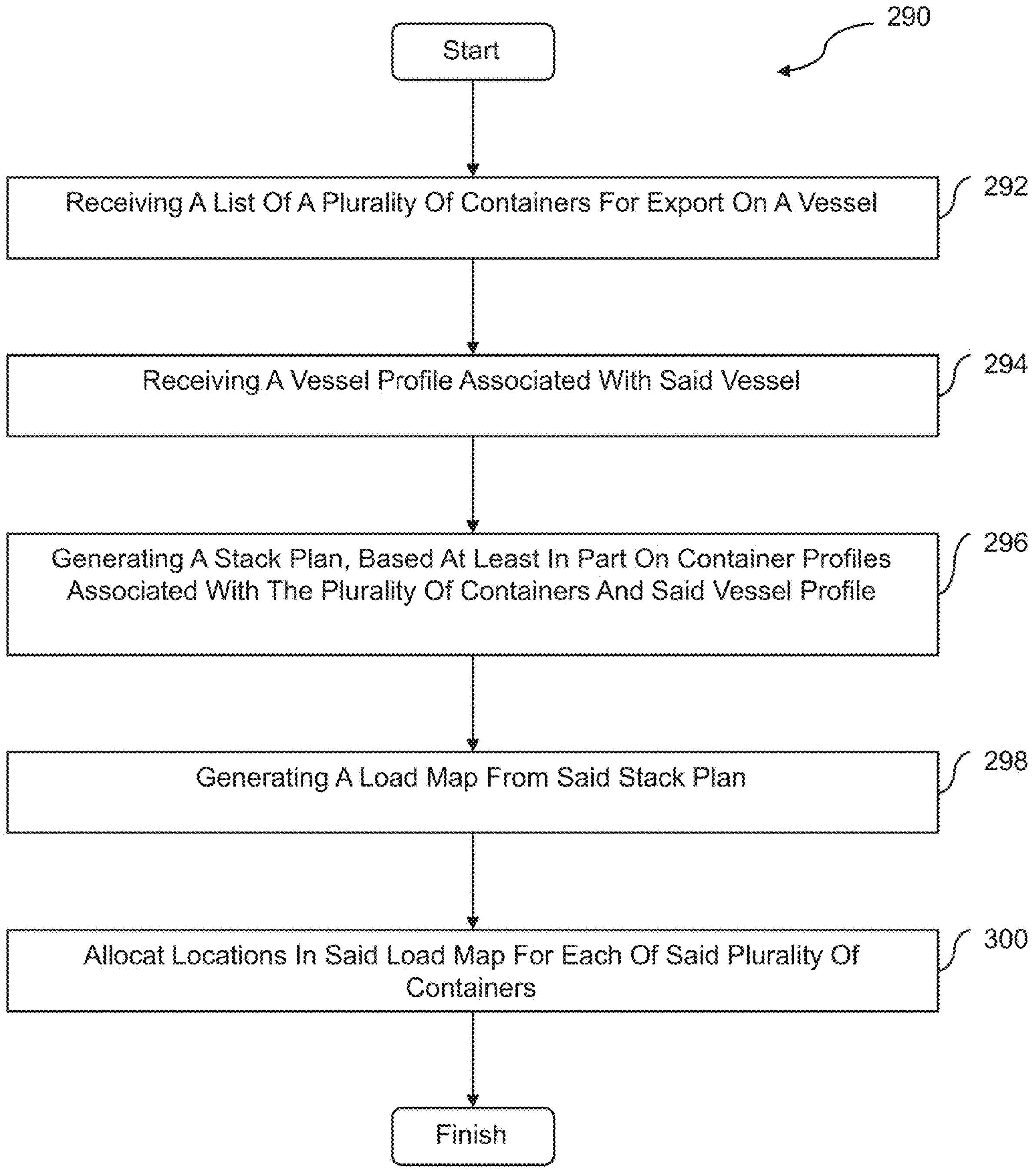

According to embodiments of the present invention, one purpose of export containers stacking system and methods detailed herein is to achieve dig free transfer of containers from the stacks to the vessel for loading. An exemplary embodiment of this is shown in FIG. 2J, where the method 200 may be continued at 290, and may further include receiving a list of a plurality of containers for export on a vessel at block 292. The method 200 continued at 290 may further include receiving a vessel profile associated with the vessel at block 294. In accordance with an embodiments of the present invention, the vessel profile may comprise information about a vessel which is receiving containers, such as the size of the vessel, cargo area specifics, maximum tonnage, port of origin, destination port, and other critical or otherwise useful information about the vessel that may be useful in the loading and/or unloading of the vessel. One of ordinary skill in the art would appreciate that there are numerous data points that could be utilized in the vessel profile, and embodiments of the present invention are contemplated for use with any such data points.

The method 200 continued at 290 may further include generating a stack plan, based at least in part on container profiles associated with the plurality of containers and the vessel profile at block 296. The method 200 continued at 290 may further include generating a load map from the stack plan at block 298. The method 200 continued at 290 may also further include allocating locations in the load map for each of the plurality of containers at block 300.

In certain embodiments, the system may use the 'Load Map' and allot individual containers to fill the Load Map. The system may be configured to order the allotment in such a way, that when loading happens, the order of containers that need to be loaded, will always be on peel layer and dig free, when they need to be transferred out from the yard stacks to be loaded on to the vessel.

In one embodiment of the present invention, allotment is done by the system on a stack by stack basis. The number of containers needed in the stack, destination port of container, cargo type of container, container length, all will be matched as per the 'Load Map'. While allotting containers to a stack, the sum gross weight of the stack should not cross the max stack weight threshold for the vessel. In preferred embodiments, heavier containers given locations by the system such that they are allotted towards the bottom of the Stack followed by lighter containers towards the top of stack so that center of gravity is towards the bottom of the vessel.

In certain embodiments of the present invention, discharge container stacks with containers discharged during a work shift will be blocked from any further stacking even if the stacks have not reached maximum tiers. Topmost containers in those stacks may be added to a pickups invitations queue, resulting in appointment process for import (i.e., pickup).

According to an embodiment of the present invention, If it is end of last shift of the day, then the system may be configured to cancel all un-accepted invites which are past the acceptance threshold hours set by the terminal (for example 72 hours). The system may be configured to notify transporters or BCOs of such cancellations via electronic means, such as SMS/Push message alerts, email or other means.

In certain embodiments, all un-fulfilled appointments, which are past the appointments wait threshold hours set by the Terminal (for example 48 hours) may be cancelled by the system. Again, notifications may be made by the system via any appropriate electronic means (e.g., SMS/Push message alerts with the cancelled appointment IDs sent to the corresponding drivers and dispatchers).

In some cases, the method 200 may be performed by one or more hardware processors, such as the processors 192 of FIG. 1, configured by machine-readable instructions, such as the machine-readable instructions 106 of FIG. 1. In this aspect, the method 200 may be configured to be implemented by the modules, such as the modules 108, 110, 112, 114, 116, 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 178, 180, 182, 184, 186 and/or 188 discussed above in FIG. 1.

Figure 3:
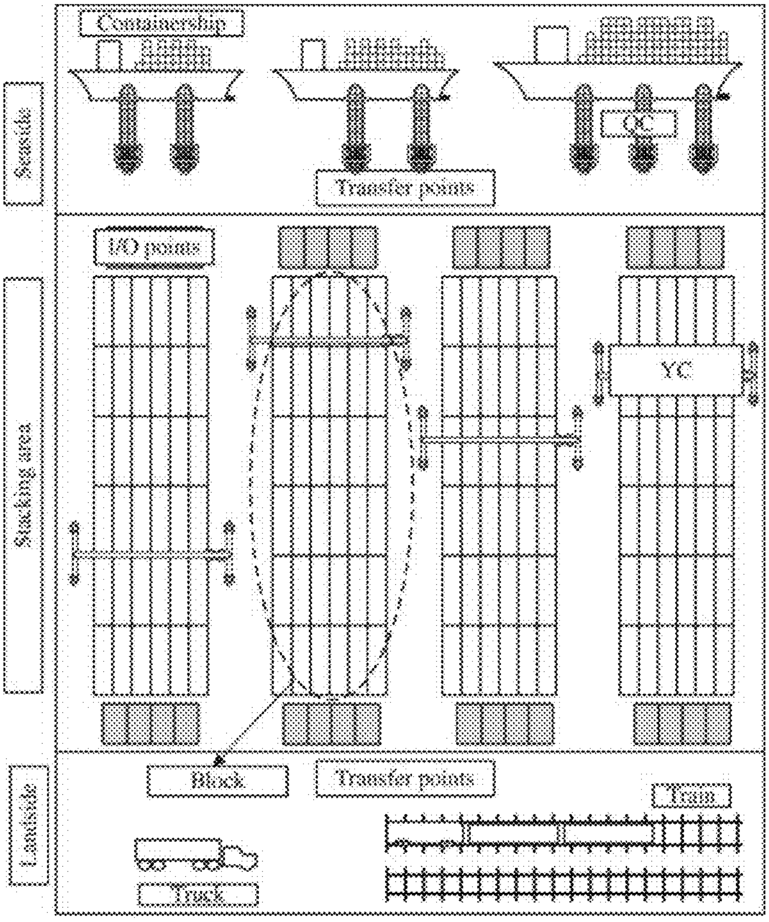
FIG. 3 illustrates a sample of a container terminal layout.
Figure 3:
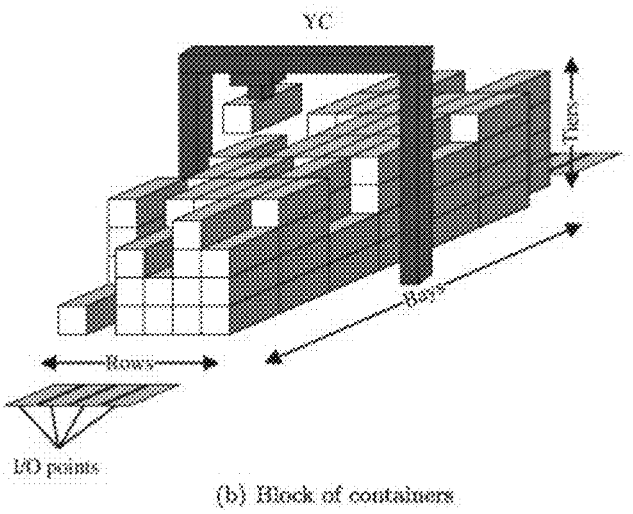

FIG. 3 is an overview depiction of a terminal in which embodiments of the present invention may be implemented.

Figure 4:
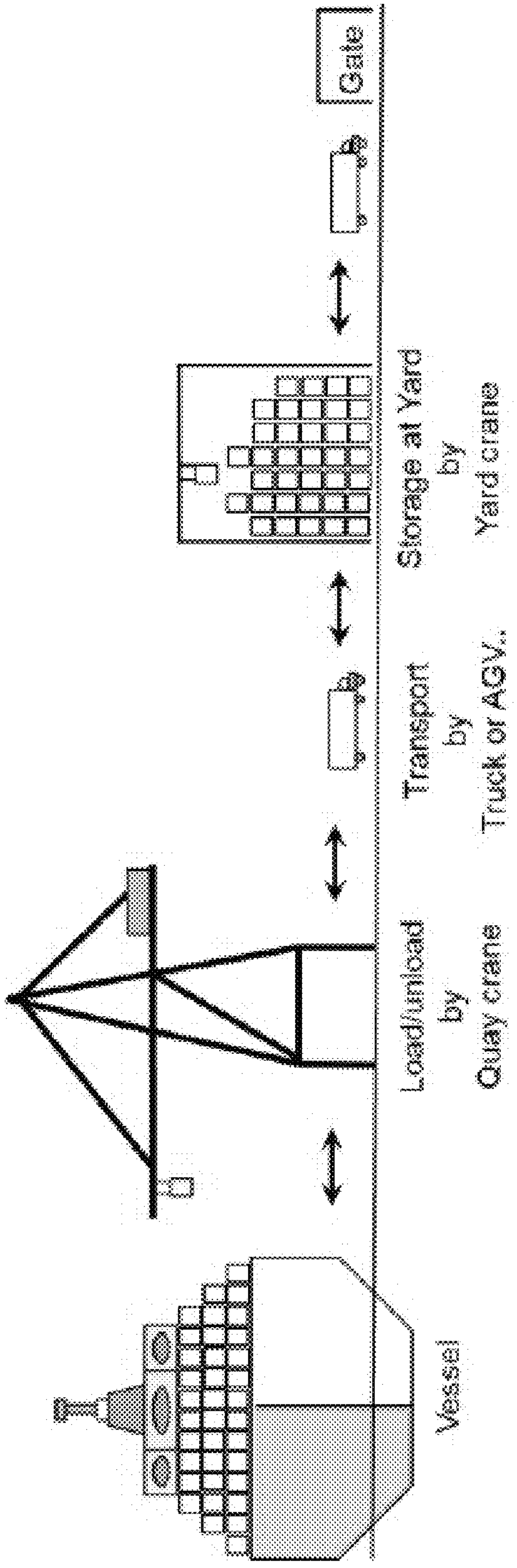
FIG. 4 illustrates a sample of a container terminal operation.

FIG. 4 is an overview depiction of the unloading and loading process of a vessel at a terminal.

Figure 5:
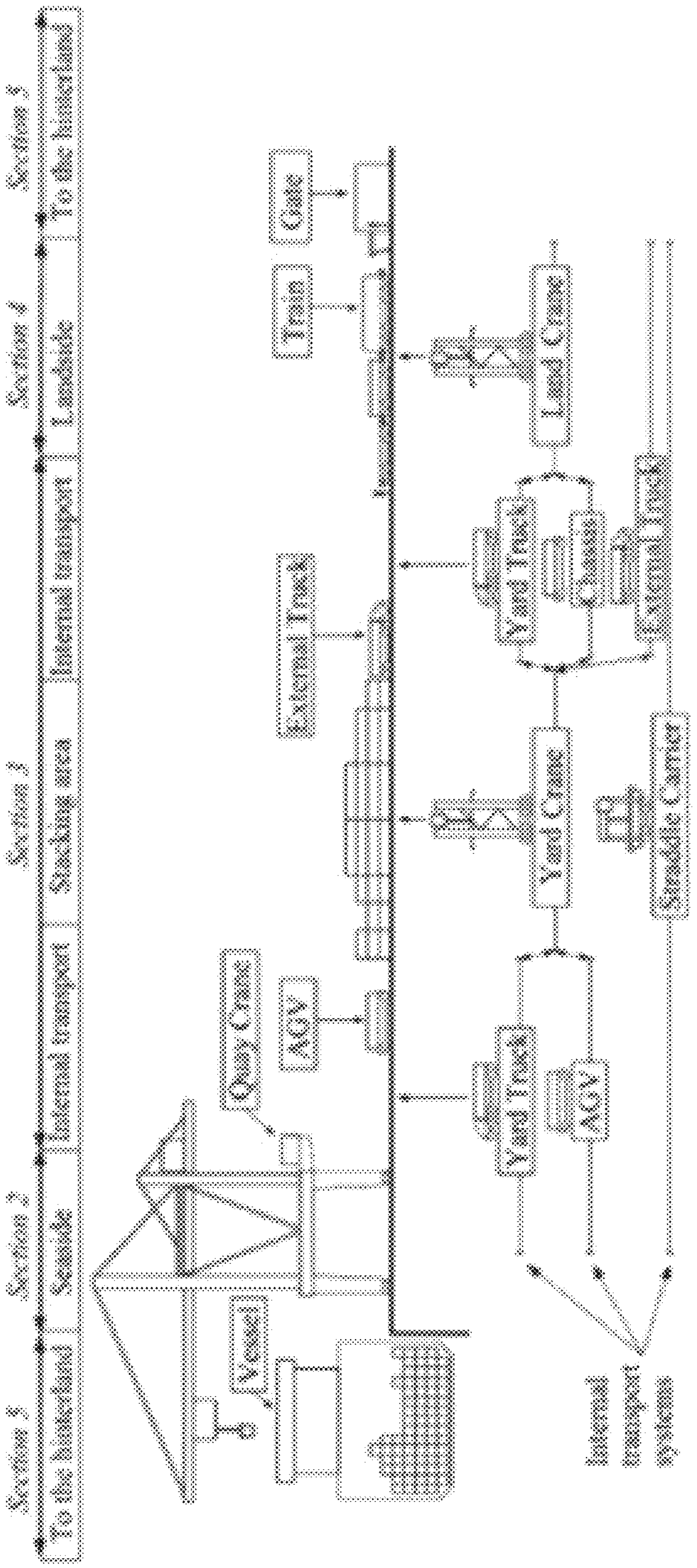
FIG. 5 illustrates a sample of a container terminal operation.

FIG. 5 is an overview depiction of the unloading and loading process of a vessel at a terminal.

Figure 6:
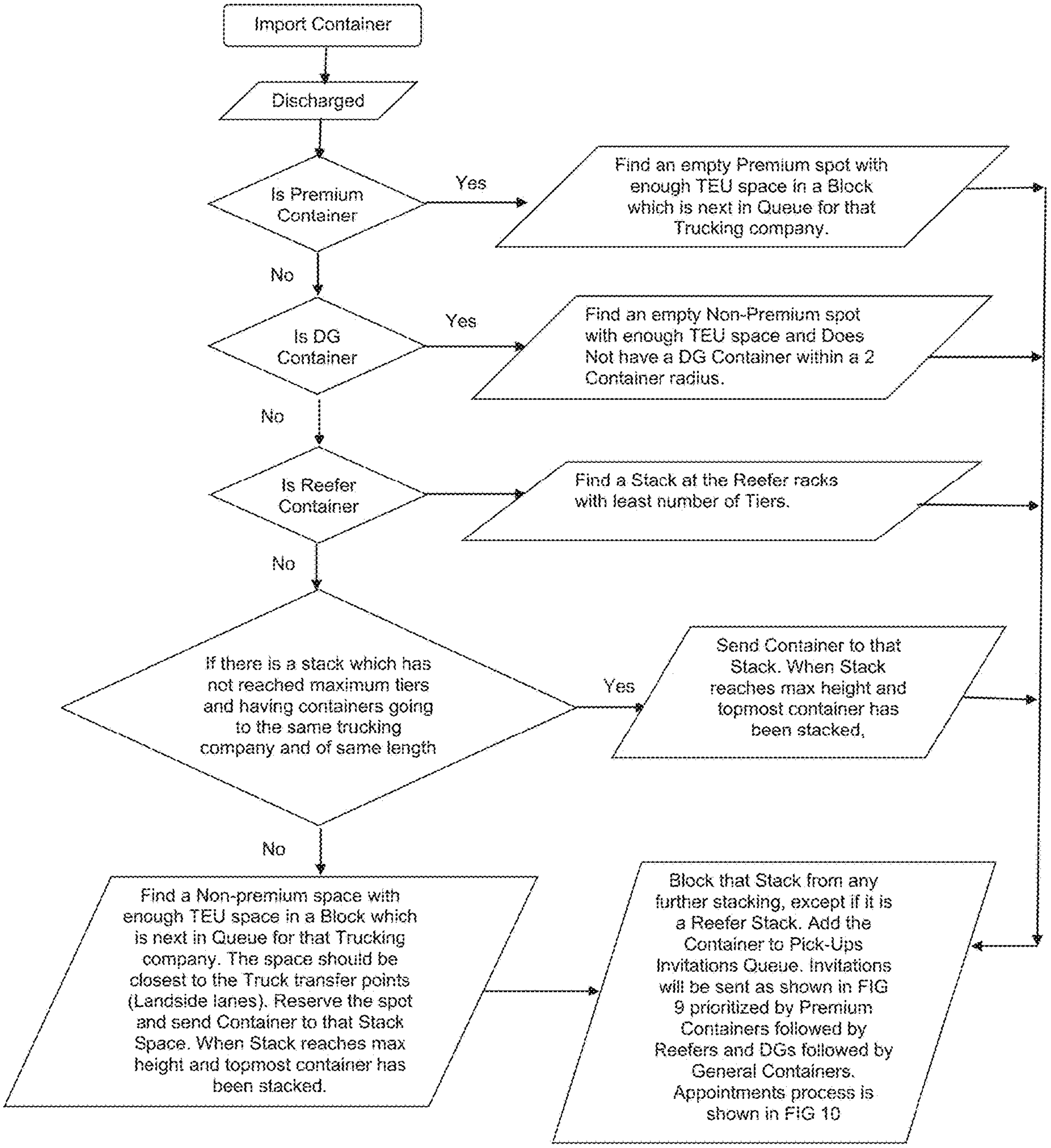
FIG. 6 illustrates an exemplary method for discharge of import containers for stacking in an automated terminal.

FIG. 6 illustrates an exemplary method for discharge of import containers for stacking in an automated terminal. FIG. 6 details an exemplary method with decision tree format, identifying one way the determinations could be made by the system, in an exemplary embodiment. One of ordinary skill in the art would appreciate that there are numerous, arrangements, ways and timings for these decisions to be made, and embodiments of the present invention are contemplated for use with any such arrangement, way or timing for such decisions.

Figure 7:
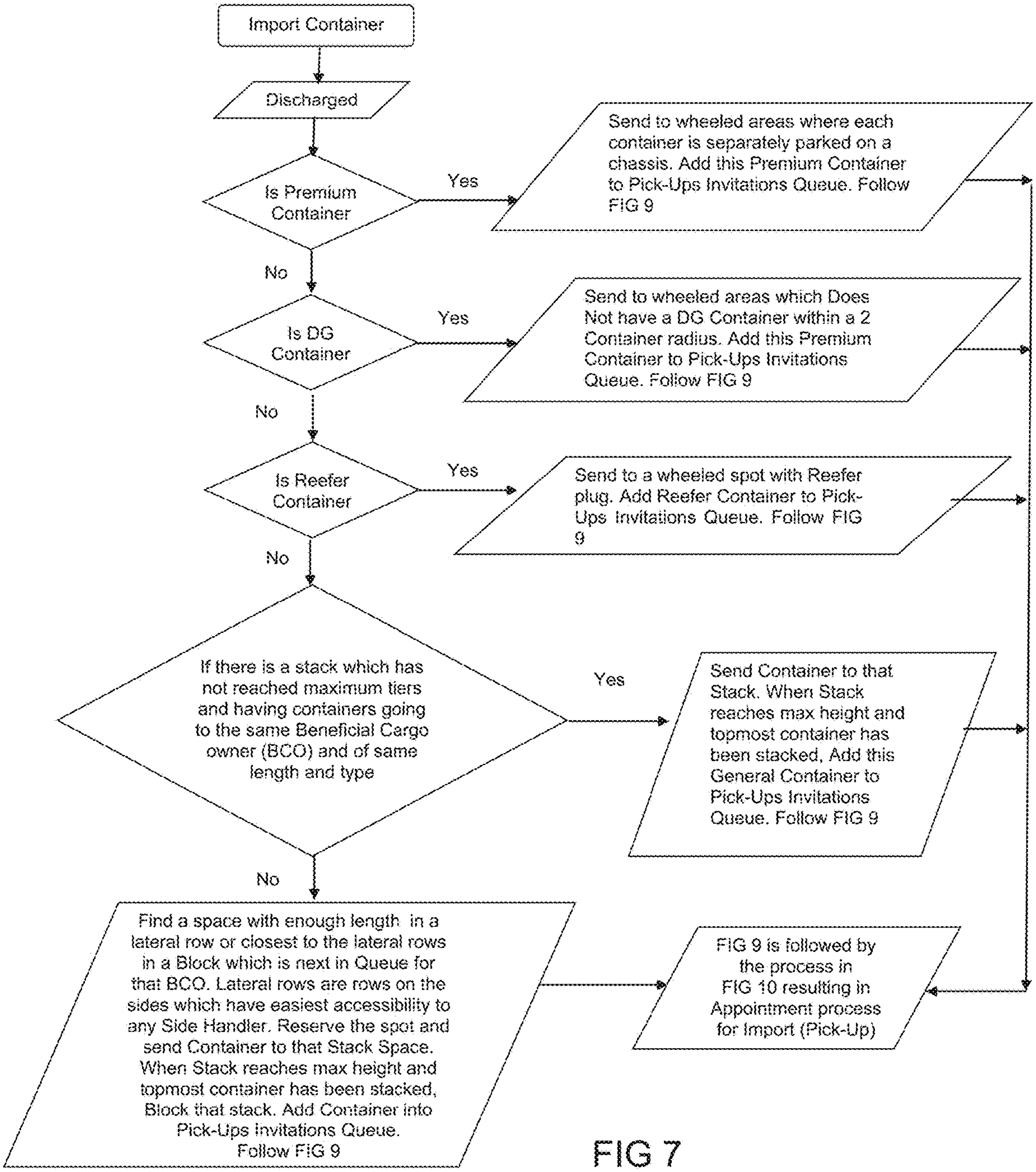
FIG. 7 illustrates an exemplary method for discharge of import containers for stacking in a conventional terminal.

FIG. 7 illustrates an exemplary method for discharge of import containers for stacking in a conventional terminal. FIG. 7 details an exemplary method with decision tree format, identifying one way the determinations could be made by the system, in an exemplary embodiment. One of ordinary skill in the art would appreciate that there are numerous, arrangements, ways and timings for these decisions to be made, and embodiments of the present invention are contemplated for use with any such arrangement, way or timing for such decisions.

Figure 8:
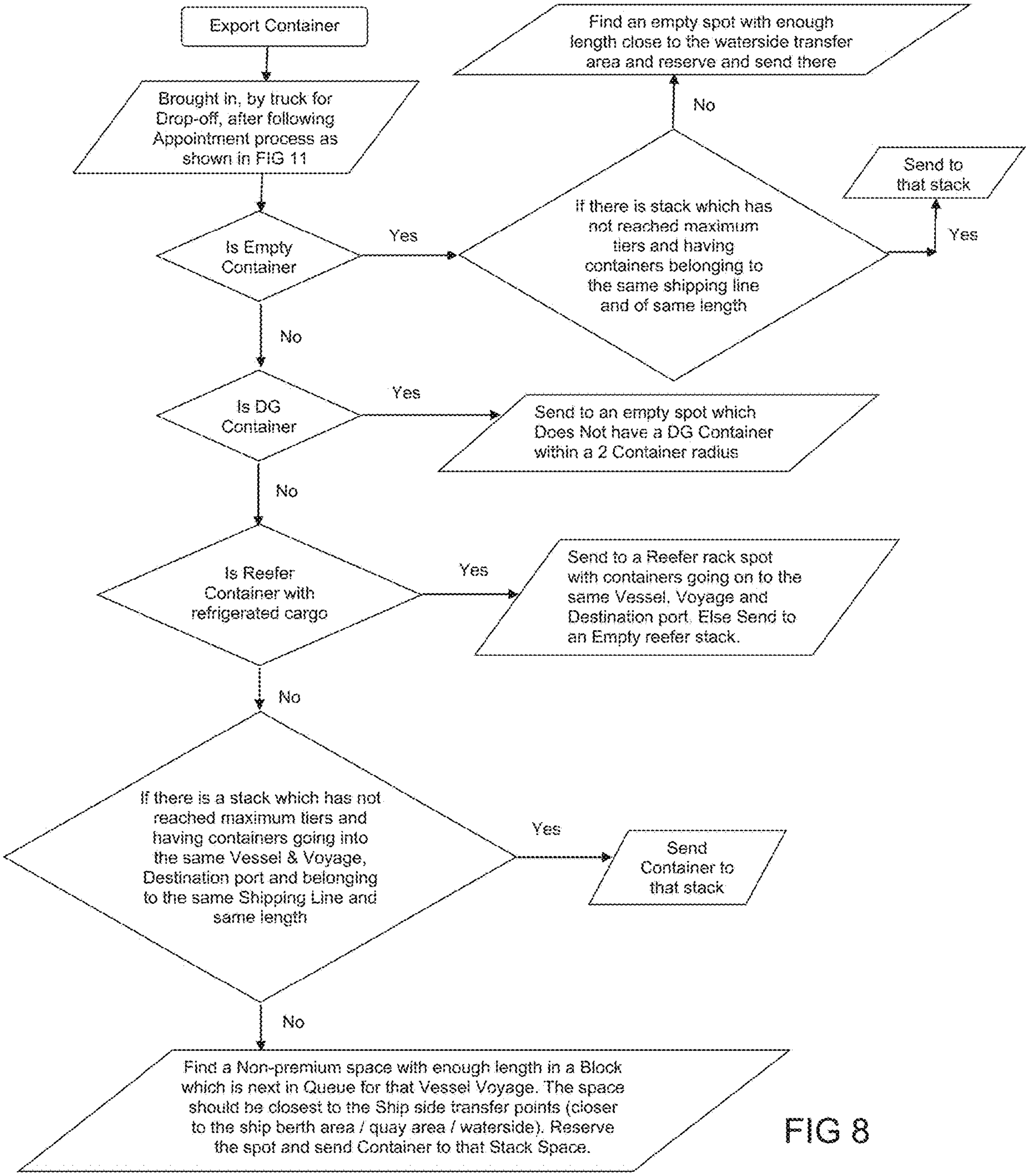
FIG. 8 illustrates an exemplary method for stacking of load or export containers.

FIG. 8 illustrates an exemplary method for stacking of load or export containers. FIG. 8 details an exemplary method with decision tree format, identifying one way the determinations could be made by the system, in an exemplary embodiment. One of ordinary skill in the art would appreciate that there are numerous, arrangements, ways and timings for these decisions to be made, and embodiments of the present invention are contemplated for use with any such arrangement, way or timing for such decisions.

Figure 9:
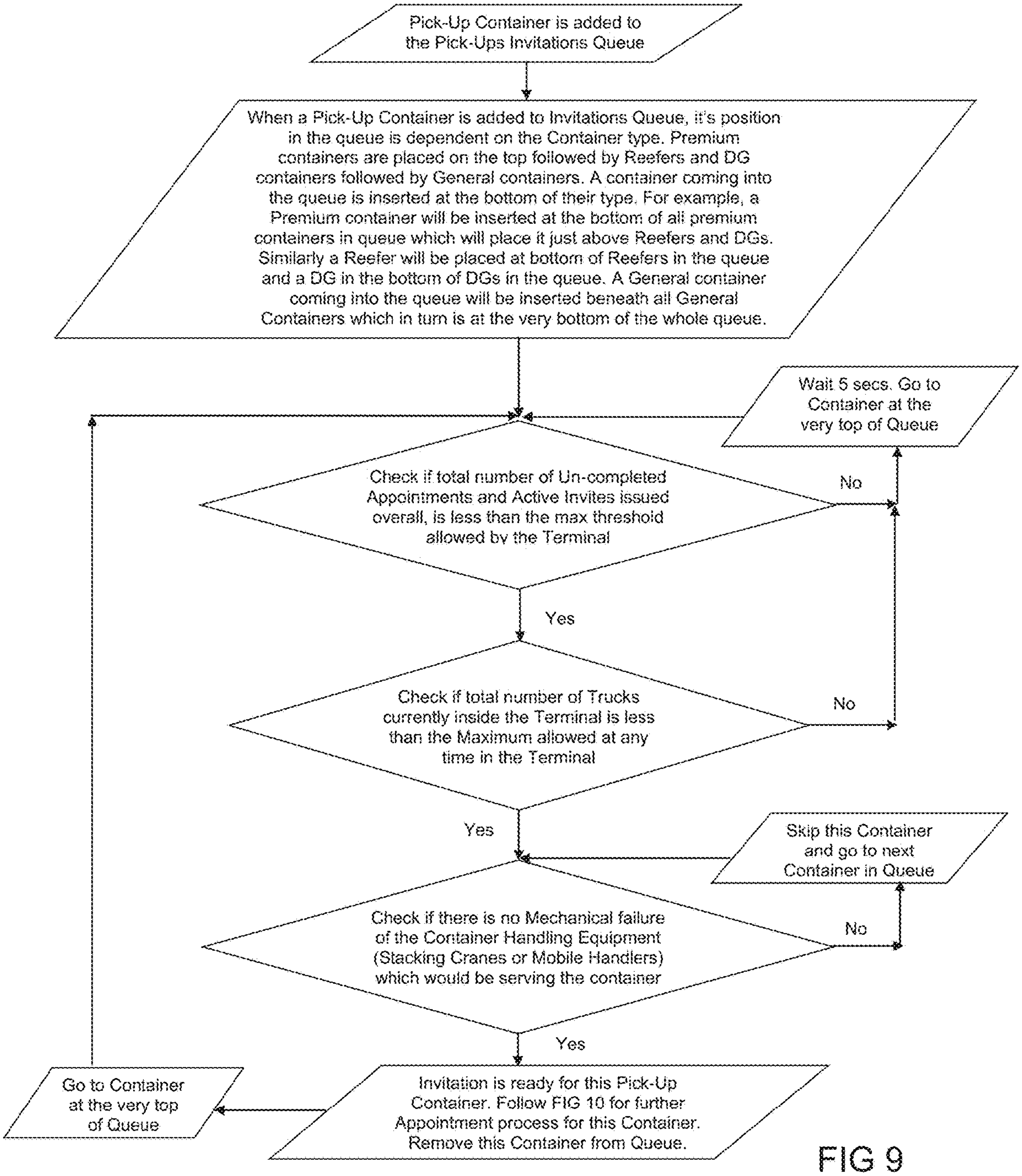
FIG. 9 illustrates an exemplary method for managing an invitations queue for import containers and issuance of invitations.

FIG. 9 illustrates an exemplary method for managing an invitations queue for import containers and issuance of invitations. FIG. 9 details an exemplary method with decision tree format, identifying one way the determinations could be made by the system, in an exemplary embodiment. One of ordinary skill in the art would appreciate that there are numerous, arrangements, ways and timings for these decisions to be made, and embodiments of the present invention are contemplated for use with any such arrangement, way or timing for such decisions.

Figure 10:
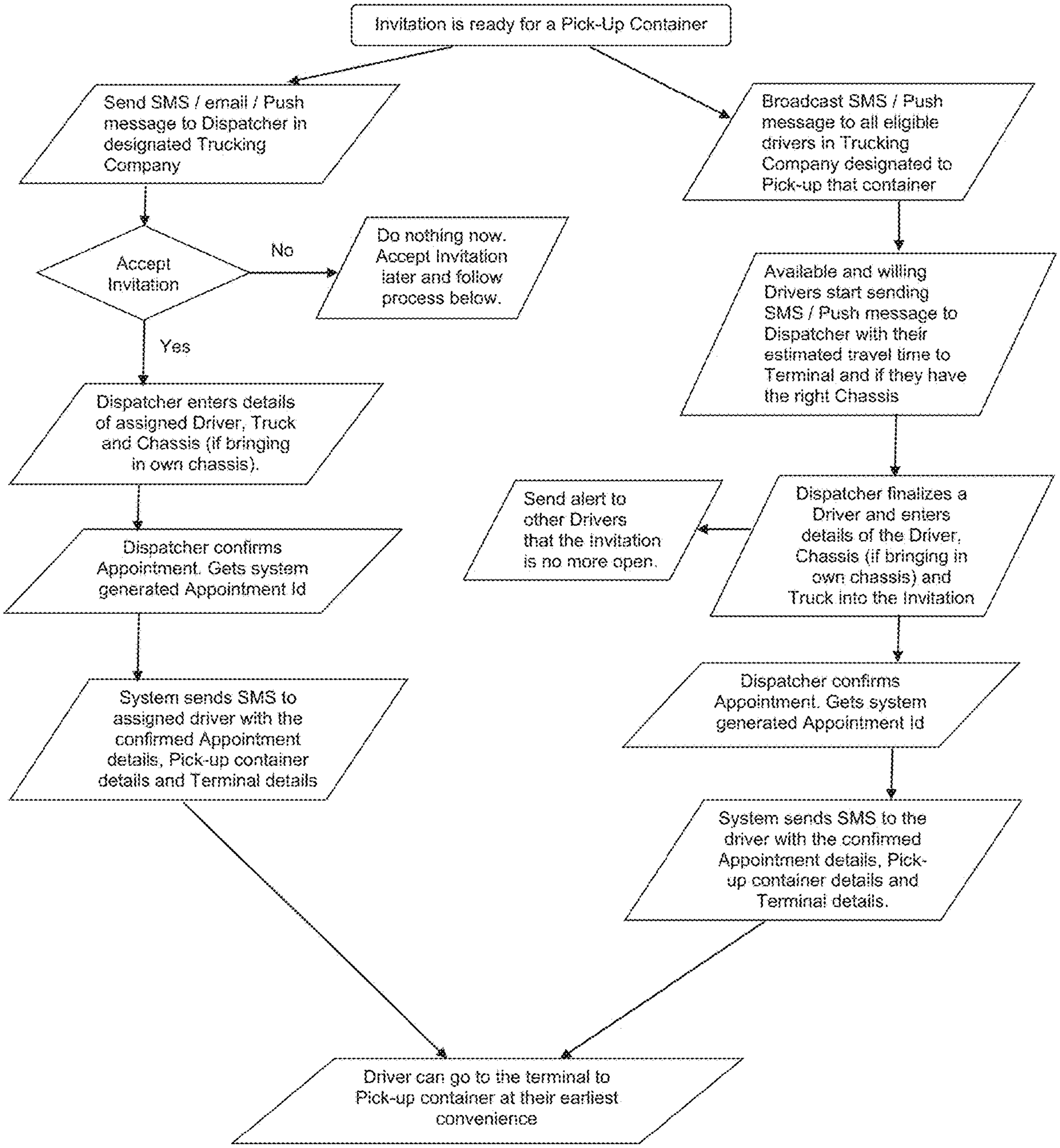
FIG. 10 illustrates an exemplary method for an automated appointment process for import containers.

FIG. 10 illustrates an exemplary method for an automated appointment process for import containers. FIG. 10 details an exemplary method with decision tree format, identifying one way the determinations could be made by the system, in an exemplary embodiment. One of ordinary skill in the art would appreciate that there are numerous, arrangements, ways and timings for these decisions to be made, and embodiments of the present invention are contemplated for use with any such arrangement, way or timing for such decisions.

Figure 11:
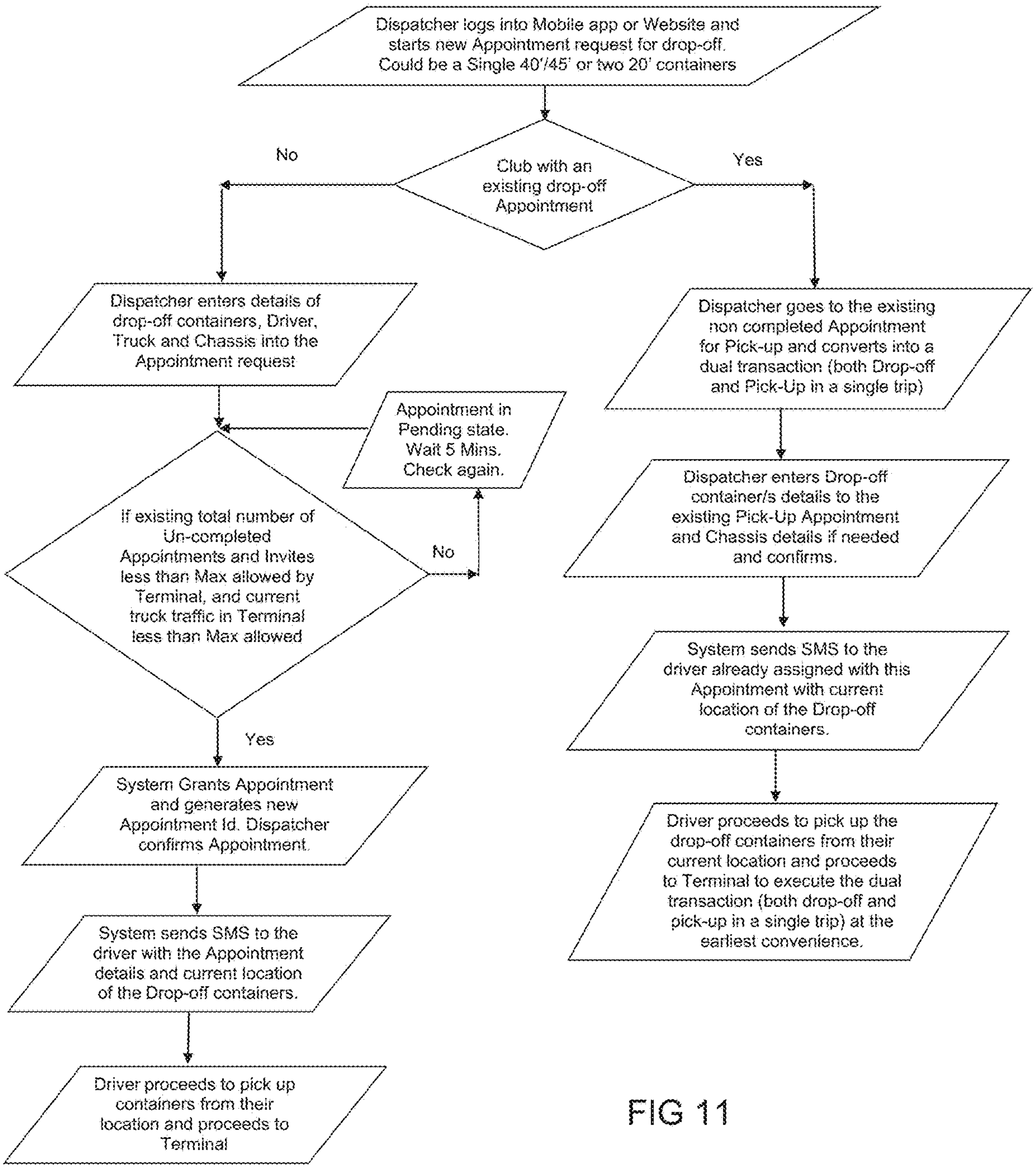
FIG. 11 illustrates an exemplary method for an automated appointment process for export containers.

FIG. 11 illustrates an exemplary method for an automated appointment process for export containers. FIG. 11 details an exemplary method with decision tree format, identifying one way the determinations could be made by the system, in an exemplary embodiment. One of ordinary skill in the art would appreciate that there are numerous, arrangements, ways and timings for these decisions to be made, and embodiments of the present invention are contemplated for use with any such arrangement, way or timing for such decisions.

Figure 12:
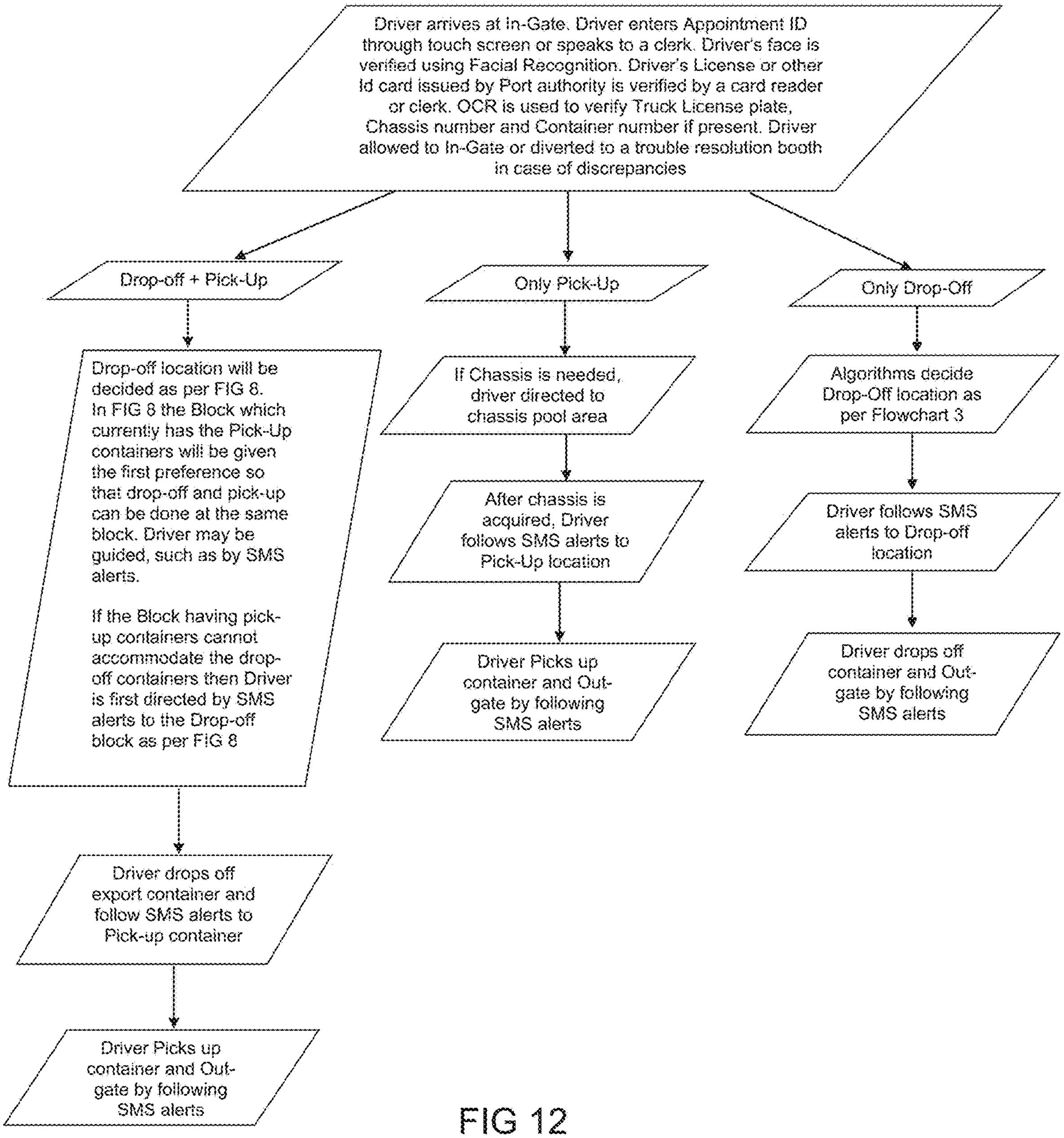
FIG. 12 illustrates an exemplary embodiment for an automated appointment fulfillment process for transporters.

FIG. 12 illustrates an exemplary embodiment for an automated load planning process for dig free loading of containers.

Figure 13:
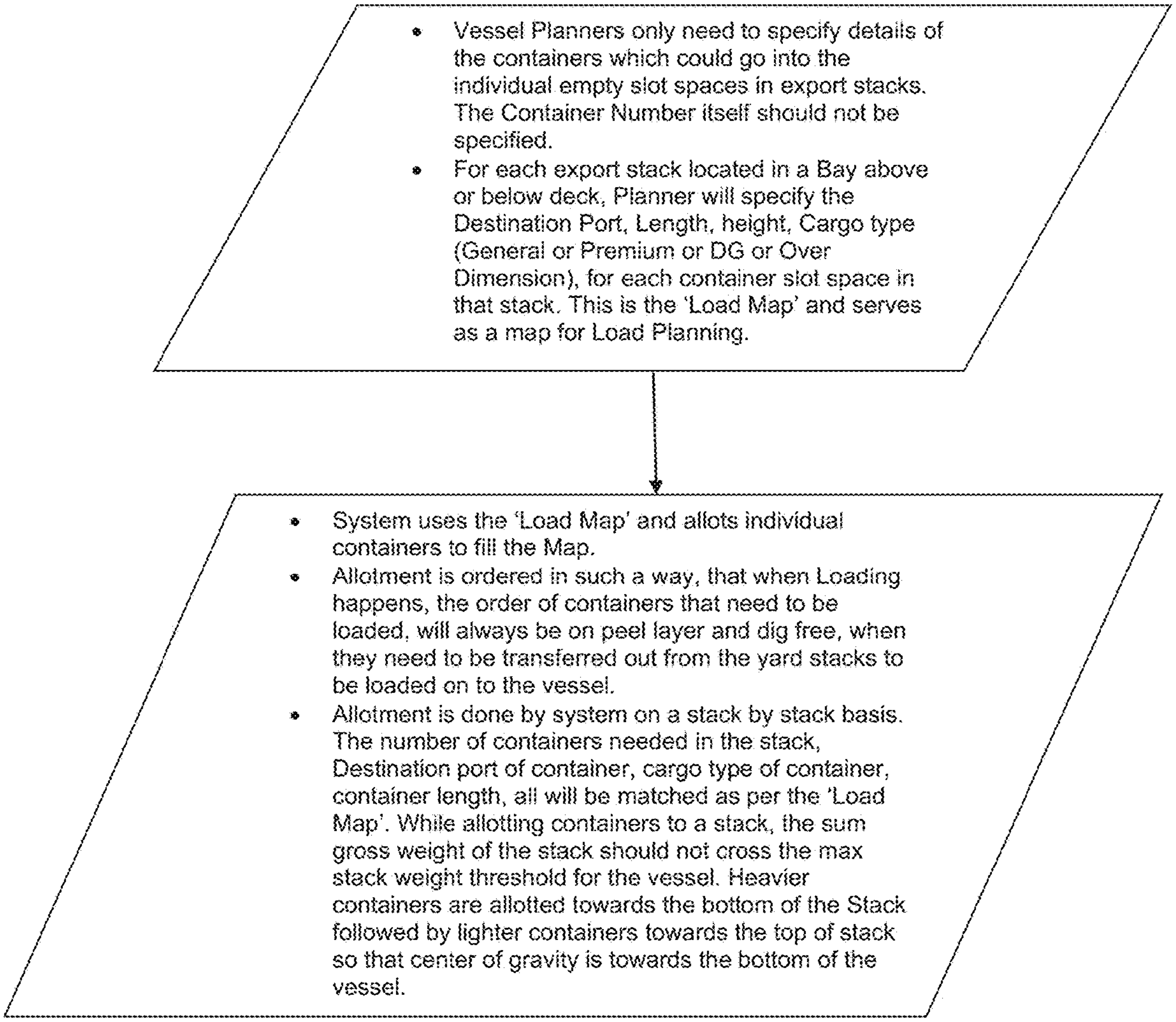
FIG. 13 illustrates an exemplary embodiment for an automated load planning process for dig free loading of containers.

FIG. 13 illustrates an exemplary embodiment for an automated load, planning and dig process for containers.

Figure 14:
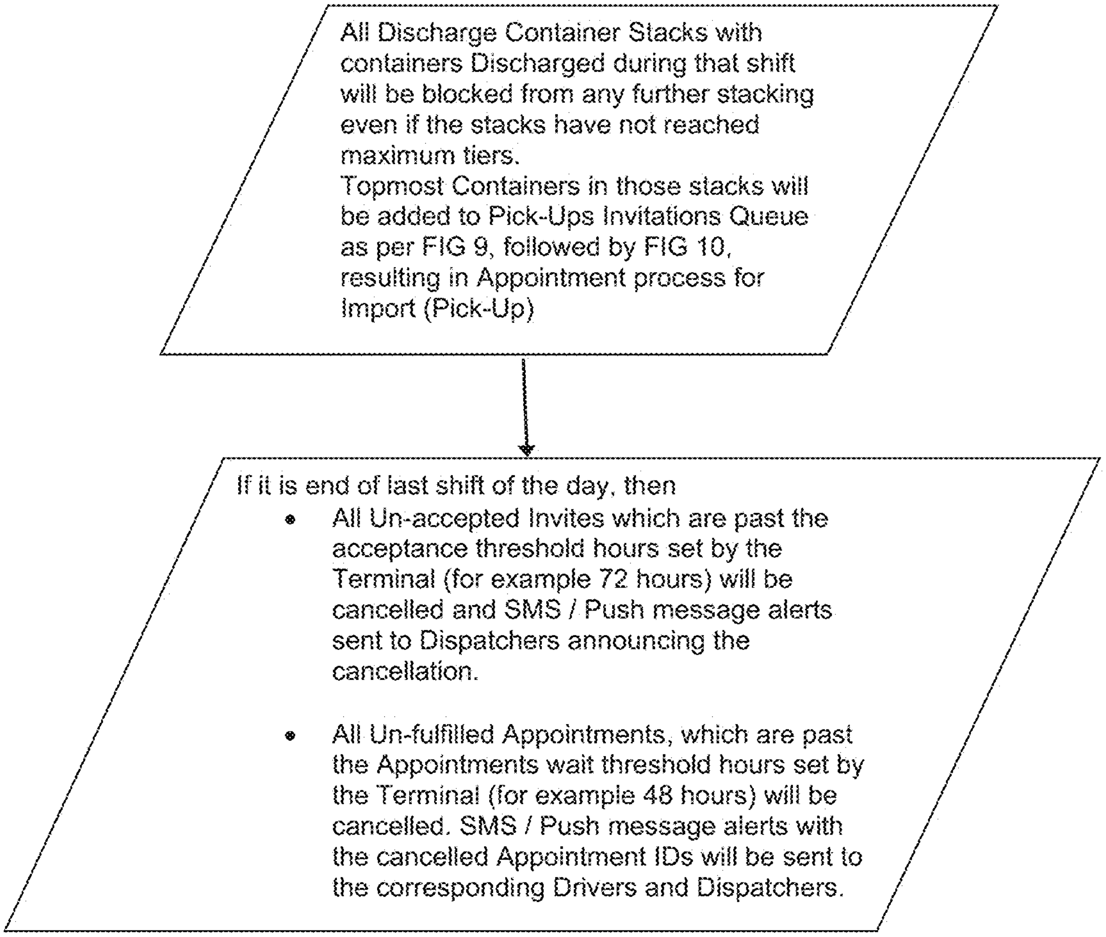
FIG. 14 illustrates an exemplary embodiment for an automated end of work shift process.
Figure 15:
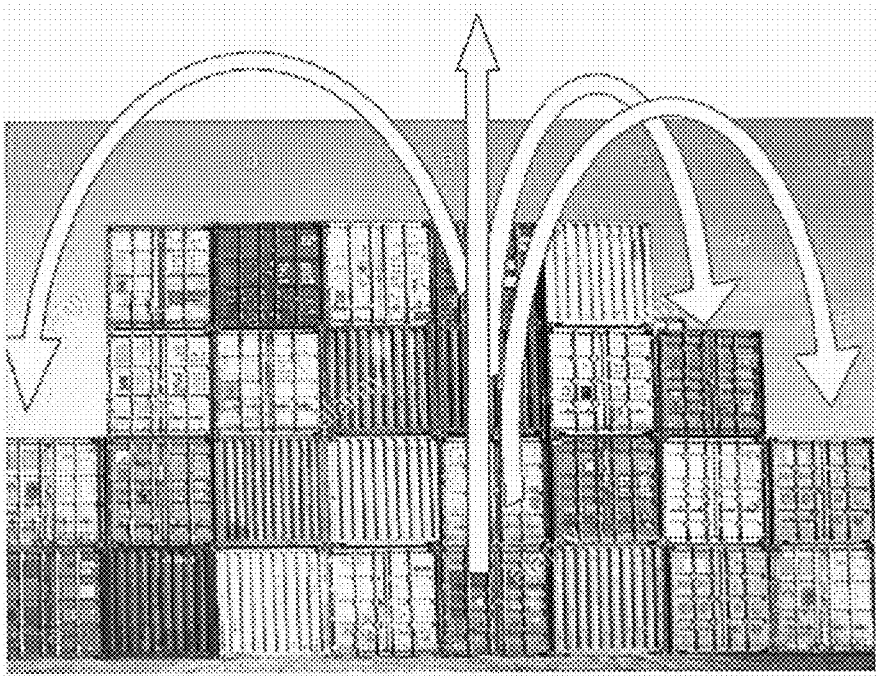
FIG. 15 illustrates a stack of containers stacked randomly, wherein containers have to be moved out in order to get to a desired container.

FIG. 14 illustrates an exemplary embodiment for an automated end of work shift process.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention.

Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A computerized system, comprising:

one or more hardware processors, wherein the one or more hardware processors are selected from the group consisting of general-purpose processors, digital signal processors (DSPs), field-programmable gate arrays (FPGAs), application-specific integrated circuits (ASICs), and multi-core processors;

one or more non-transitory electronic storage devices coupled to the one or more hardware processors, wherein the one or more non-transitory electronic storage devices comprise at least one of semiconductor memory, magnetic memory, or optical memory, and wherein the one or more non-transitory electronic storage devices comprise at least one of random access memory (RAM), read only memory (ROM), and a hard disk drive (HDD);

one or more antennas coupled to the one or more hardware processors via one or more radio interfaces, wherein the one or more radio interfaces support one or more of LTE, 5G, wireless local area network (WLAN), Bluetooth, near field communication (NFC), radio frequency identifier (RFID), and ultrawideband (UWB); and machine-readable instructions stored on the one or more non-transitory electronic storage devices that, when executed by the one or more hardware processors, cause the one or more hardware processors to:

receive, via the one or more radio interfaces coupled to the one or more antennas and from a gate-based data capture component at a container terminal, electronic data comprising a container identification profile associated with a container, wherein said container identification profile comprises a container type identifier, and wherein said container type identifier identifies said container as one of a premium container, a dangerous goods container, a refrigerated container, or a general container;

identify, via said one or more hardware processors, one or more potential locations within the container terminal for placement of said container, based at least in part on said container type identifier and one or more container-type-specific placement rules, wherein the one or more container-type-specific placement rules comprise: (i) when said container type identifier identifies said container as a dangerous goods container, a spatial-separation rule requiring that said container be placed with no other dangerous goods container within a two-container radius of said container; (ii) when said container type identifier identifies said container as a refrigerated container, a rule requiring that said container be placed at a designated refrigerated container rack; (iii) when said container type identifier identifies said container as a premium container, a rule assigning said container to a premium spot in a block that is next in queue for a trucking company associated with said container; and (iv) when said container type identifier identifies said container as a general container, a stacking-compatibility rule requiring that said container be placed in a stack containing containers of a same container length and a same trucking company;

select, via said one or more hardware processors, a container location for placement of said container from the one or more potential locations, wherein the selection of the container location creates an optimized peel pile in which each container within the optimized peel pile is accessible from a top tier of its respective stack without requiring movement of any other container;

transmit, via the one or more radio interfaces coupled to the one or more antennas, the container location for placement of said container to a transporter and to container handling equipment at the container terminal, wherein the container handling equipment comprises at least one of a stacking crane and a mobile handler;

insert, via said one or more hardware processors, a pickup invitation into a container pickup storage list persistently stored in the one or more non-transitory electronic storage devices, wherein said pickup invitation is electronically entered into said container pickup storage list at a position in the container pickup storage list determined by a priority-based queue-insertion rule, wherein the priority-based queue-insertion rule ranks premium containers above refrigerated containers and dangerous goods containers, and ranks refrigerated containers and dangerous goods containers above general containers, and wherein the position that ensures pickup of the container maintains optimization of the optimized peel pile;

in response to the container handling equipment being returned to an operational status:

transmit, via the one or more radio interfaces coupled to the one or more antennas, one or more pickup invitations from said container pickup storage list to one or more transporters, in an order based at least in part on locations of said one or more pickup invitations in said container pickup storage list and conditioned at least in part on the operational status of the container handling equipment being returned as operational, such that optimization of the optimized peel pile is maintained.

2. The computerized system of claim 1, wherein the one or more processors are further configured by machine-readable instructions to: check, via said one or more processors, a total number of uncompleted sent pickup invitations; identify the total number of uncompleted sent pickup invitations being below a max threshold of total uncompleted sent pickup invitations; and send additional pickup invitations from said container pickup storage list until said max threshold of total uncompleted sent pickup invitations is reached.

3. The computerized system of claim 1, wherein the one or more processors are further configured by machine-readable instructions to: identify a beneficial cargo owner, based at least in part on said container identification profile; identify one or more containers associated with said beneficial cargo owner; identify a location of said one or more containers associated with said beneficial cargo owner; and update said location for placement of said container based at least in part on said location of said one or more containers associated with said beneficial cargo owner.

4. The computerized system of claim 1, wherein the one or more processors are further configured by machine-readable instructions to: receive, via said one or more processors, a second container identification profile associated with a second container, wherein said second container identification profile comprises a second container type identifier identify, via said one or more processors, a second location for placement of said second container, based at least in part on said second container type identifier; send, via said one or more processors, the second location for placement of said second container to a second transporter; insert, via said one or more processors, at least a portion of said second container identification profile into a container export list, wherein said portion of said second container identification profile comprises a vessel identifier send, via said one or more processors, one or more export notifications from said container export list.

5. The computerized system of claim 4, wherein the one or more processors are further configured by machine-readable instructions to: identify a beneficial cargo owner, based at least in part on said second container identification profile; identify one or more containers associated with said beneficial cargo owner; identify a location of said one or more containers associated with said beneficial cargo owner; and update said second location for placement of said second container based at least in part on said location of said one or more containers associated with said beneficial cargo owner.

6. The computerized system of claim 1, wherein the one or more processors are further configured by machine-readable instructions to: checking, via said one or more processors, a total number of transports at a terminal where the location for placement of said container is located; invitations be below a max threshold of total transports permissible at the terminal; checking, via said one or more processors, a status of a container handling equipment at the terminal where the location for placement of said container is located; and send a pickup notification, via said one or more processors, toa second transporter, based at least in part on the status of the container handling equipment being returned as operational and the total number of transports at the terminal where the location for placement of said container is located is below the max threshold of total transports permissible at the terminal.

7. The computerized system of claim 1, wherein the one or more processors are further configured by machine-readable instructions to: receive an acceptance of a first pickup invitation selected from one or more pickup invitations, via said one or more processors, wherein said acceptance of said first pickup invitation comprises a transport profile generate an appointment profile, based at least in part on said transport profile; send an appointment confirmation, based at least in part on said appointment profile, to a recipient, wherein said recipient is identified in said transport profile.

8. The computerized system of claim 7, wherein the transport profile further comprises one or more of an identification of a type of vehicle, a type of chassis, and a driver identifier.

9. The computerized system of claim 1, wherein the one or more processors are further configured by machine-readable instructions to: receiving, via said one or more processors, a drop off request, wherein said drop off request comprises a drop off profile checking, via said one or more processors, a total number of incomplete appointments at a terminal; identify whether the total number of incomplete appointments is below a max threshold of total appointments permissible at the terminal; generate an appointment detail profile, based at least in part on the total number of incomplete appointments at the terminal being below the max threshold of total appointments permissible and the drop off profile; and send an appointment confirmation, based at least in part on the appointment detail profile, via said one or more processors, to a second transporter.

10. The computerized system of claim 1, wherein the one or more processors are further configured by machine-readable instructions to: receive an appointment identifier, via said one or more processors, wherein said appointment identifier comprises one or more of an identification card, license plate number, biometric recognition information, and passcode confirm an identity of a second transporter, via said one or more processors, based at least in part on said appointment identifier; provide to said second transporter, via said one or more processors, an appointment information profile, wherein said appointment information profile comprises one or more of, a drop off location, a pickup location, chassis identification information, directions to said drop off location, and directions to said pickup location.

11. The computerized system of claim 1, wherein the one or more processors are further configured by machine-readable instructions to: receiving, via said one or more processors, a list of a plurality of containers for export on a vessel; receiving, via said one or more processors, a vessel profile associated with said vessel; generating, via said one or more processors, a stack plan, based at least in part on container profiles associated with the plurality of containers and said vessel profile; generating, via said one or more processors, a load map from said stack plan; allocate, via said one or more processors, locations in said load map for each of said plurality of containers, wherein allocation is based at least in part on one or more of cargo type, container length, destination port, number of containers in a stack, and weight of individual containers.

12. A computerized method, comprising:

receiving, by one or more hardware processors selected from the group consisting of general-purpose processors, digital signal processors (DSPs), field-programmable gate arrays (FPGAs), application-specific integrated circuits (ASICs), and multi-core processors, via one or more radio interfaces coupled to one or more antennas and from a gate-based data capture component at a container terminal, electronic data comprising a container identification profile associated with a container, wherein said container identification profile comprises a container type identifier, and wherein said container type identifier identifies said container as one of a premium container, a dangerous goods container, a refrigerated container, or a general container;

identifying, by the one or more hardware processors, one or more potential locations within the container terminal for placement of said container, based at least in part on said container type identifier and one or more container-type-specific placement rules, wherein the one or more container-type-specific placement rules comprise: (i) when said container type identifier identifies said container as a dangerous goods container, a spatial-separation rule requiring that said container be placed with no other dangerous goods container within a two-container radius of said container; (ii) when said container type identifier identifies said container as a refrigerated container, a rule requiring that said container be placed at a designated refrigerated container rack; (iii) when said container type identifier identifies said container as a premium container, a rule assigning said container to a premium spot in a block that is next in queue for a trucking company associated with said container; and (iv) when said container type identifier identifies said container as a general container, a stacking-compatibility rule requiring that said container be placed in a stack containing containers of a same container length and a same trucking company;

selecting, by the one or more hardware processors, a container location for placement of said container from the one or more potential locations, wherein the selection of the container location creates an optimized peel pile in which each container within the optimized peel pile is accessible from a top tier of its respective stack without requiring movement of any other container;

transmitting, by the one or more hardware processors and via the one or more radio interfaces coupled to the one or more antennas, the container location for placement of said container to a transporter and to container handling equipment at the container terminal, wherein the container handling equipment comprises at least one of a stacking crane and a mobile handler;

inserting, by the one or more hardware processors, a pickup invitation into a container pickup storage list persistently stored in one or more non-transitory electronic storage devices, wherein the one or more non-transitory electronic storage devices comprise at least one of semiconductor memory, magnetic memory, or optical memory, wherein said pickup invitation being inserted into said container pickup storage list at a position in the container pickup storage list determined by a priority-based queue-insertion rule, wherein the priority-based queue-insertion rule ranks premium containers above refrigerated containers and dangerous goods containers, and ranks refrigerated containers and dangerous goods containers above general containers, and wherein the position that ensures pickup of the container maintains optimization of the optimized peel pile; and in response to the container handling equipment being returned to an operational status:

transmitting, by the one or more hardware processors and via the one or more radio interfaces coupled to the one or more antennas, one or more pickup invitations from said container pickup storage list to one or more transporters, based at least in part on locations of said one or more pickup invitations in said container pickup storage list and conditioned at least in part on the operational status of the container handling equipment, such that optimization of the peel pile is maintained.

13. The computerized method of claim 12, wherein the method is further comprising checking, via said one or more processors, a total number of uncompleted sent pickup invitations;

identifying the total number of uncompleted sent pickup invitations being below a max threshold of total uncompleted sent pickup invitations; and sending additional pickup invitations from said container pickup storage list until said max threshold of total uncompleted sent pickup invitations is reached.

14. The computerized method of claim 12, wherein the method is further comprising identifying a beneficial cargo owner, based at least in part on said container identification profile; identifying one or more containers associated with said beneficial cargo owner; identifying a location of said one or more containers associated with said beneficial cargo owner; and updating said location for placement of said container based at least in part on said location of said one or more containers associated with said beneficial cargo owner.

15. The computerized method of claim 12, wherein the method is further comprising receiving, via one or more processors, a second container identification profile associated with a second container, wherein said second container identification profile comprises a second container type identifier identifying, via said one or more processors, a second location for placement of said second container, based at least in part on said second container type identifier; sending, via said one or more processors, the second location for placement of said second container to a second transporter; inserting, via said one or more processors, at least a portion of said second container identification profile into a container export list, wherein said portion of said second container identification profile comprises a vessel identifier sending, via said one or more processors, one or more export notifications from said container export list.

16. The computerized method of claim 15, wherein the method is further comprising identifying a beneficial cargo owner, based at least in part on said second container identification profile; identifying one or more containers associated with said beneficial cargo owner; identifying a location of said one or more containers associated with said beneficial cargo owner; and updating said second location for placement of said second container based at least in part on said location of said one or more containers associated with said beneficial cargo owner.

17. The computerized method of claim 12, wherein the method is further comprising checking, via said one or more processors, a total number of transports at a terminal where the location for placement of said container is located; invitations being below a max threshold of total transports permissible at the terminal; checking, via said one or more processors, a status of a container handling equipment at the terminal where the location for placement of said container is located; and sending a pickup notification, via said one or more processors, to a second transporter, based at least in part on the status of the container handling equipment being returned as operational and the total number of transports at the terminal where the location for placement of said container is located is below the max threshold of total transports permissible at the terminal.

18. The computerized method of claim 12, wherein the method is further comprising receiving an acceptance of a first pickup invitation selected from one or more pickup invitations, via said one or more processors, wherein said acceptance of said first pickup invitation comprises a transport profile generating an appointment profile, based at least in part on said transport profile; sending an appointment confirmation, based at least in part on said appointment profile, to a recipient, wherein said recipient is identified in said transport profile.

19. The computerized method of claim 18, wherein the transport profile further comprises one or more of an identification of a type of vehicle, a type of chassis, and a driver identifier.

20. The computerized method of claim 12, wherein the method is further comprising receiving, via said one or more processors, a drop off request, wherein said drop off request comprises a drop off profile checking, via said one or more processors, a total number of incomplete appointments at a terminal; identifying whether the total number of incomplete appointments is below a max threshold of total appointments permissible at the terminal; generating an appointment detail profile, based at least in part on the total number of incomplete appointments at the terminal being below the max threshold of total appointments permissible and the drop off profile; and sending an appointment confirmation, based at least in part on the appointment detail profile, via said one or more processors, to a second transporter.

21. The computerized method of claim 12, wherein the method is further comprising receiving an appointment identifier, via said one or more processors, wherein said appointment identifier comprises one or more of an identification card, license plate number, biometric recognition information, and passcode confirming an identity of a second transporter, via said one or more processors, based at least in part on said appointment identifier; providing to said second transporter, via said one or more processors, an appointment information profile, wherein said appointment information profile comprises one or more of, a drop off location, a pickup location, chassis identification information, directions to said drop off location, and directions to said pickup location.

22. The computerized method of claim 12, wherein the method is further comprising receiving, via said one or more processors, a list of a plurality of containers for export on a vessel; receiving, via said one or more processors, a vessel profile associated with said vessel; generating, via said one or more processors, a stack plan, based at least in part on container profiles associated with the plurality of containers and said vessel profile; generating, via said one or more processors, a load map from said stack plan; allocating, via said one or more processors, locations in said load map for each of said plurality of containers, wherein allocation is based at least in part on one or more of cargo type, container length, destination port, number of containers in a stack, and weight of individual containers.

* * * * *